United States Patent
Mo et al.

(10) Patent No.: US 12,342,053 B2
(45) Date of Patent: Jun. 24, 2025

(54) HYBRID CONTENT SCHEDULER

(71) Applicant: Comcast Cable Communications, LLC, Philadelphia, PA (US)

(72) Inventors: Wenchao Mo, Long Island City, NY (US); Xiewen Liu, New York, NY (US); Yushi Xu, Scarsdale, NY (US); Lei Lu, Long Island City, NY (US); Gengsheng Liu, Beijing (CN); Dawei Sun, Beijing (CN); Ran Li, Beijing (CN)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/196,399

(22) Filed: Mar. 9, 2021

(65) Prior Publication Data

US 2022/0295154 A1 Sep. 15, 2022

(51) Int. Cl.
*H04N 21/6405* (2011.01)
*H04N 21/81* (2011.01)
*H04N 21/84* (2011.01)

(52) U.S. Cl.
CPC ....... *H04N 21/6405* (2013.01); *H04N 21/812* (2013.01); *H04N 21/84* (2013.01)

(58) Field of Classification Search
CPC ........... H04N 21/812; H04N 21/44224; H04N 21/25891; H04N 21/23424; H04N 21/252; H04N 21/466
See application file for complete search history.

(56) References Cited

U.S. PATENT DOCUMENTS

| | | | |
|---|---|---|---|
| 8,046,797 B2 | 10/2011 | Bentolila et al. | |
| 8,434,104 B2 | 4/2013 | Weihs et al. | |
| 8,739,199 B2 | 5/2014 | Smith et al. | |
| 8,856,028 B2 | 10/2014 | Yang et al. | |
| 8,935,198 B1 | 1/2015 | Phillips et al. | |
| 10,250,952 B2 | 4/2019 | Haberman et al. | |
| 10,284,893 B2 | 5/2019 | Balakrishnan et al. | |
| 10,687,105 B1* | 6/2020 | Liao | H04N 21/2668 |
| 10,708,654 B1* | 7/2020 | Moraghan | H04N 21/2547 |
| 11,178,413 B1* | 11/2021 | Li | H04N 21/44204 |

(Continued)

*Primary Examiner* — Jason Salce
(74) *Attorney, Agent, or Firm* — Banner & Witcoff, Ltd.

(57) ABSTRACT

Systems, apparatuses, and methods are described for allocating content items for addressable content campaigns that target users with certain user characteristics and non-addressable content campaigns that request a certain quantity of deliveries in content delivery schedules. The insertions of addressable content items of the addressable content campaigns during slots in the content delivery schedules may be based on the predicted viewership (e.g., a number of views by targeted recipients) of the addressable content items during the slots. The deliveries of the content items from the addressable and non-addressable content campaigns may be scheduled to optimize values associated with viewings by targeted recipients of the assigned addressable content items and values associated with a quantity of deliveries of assigned non-addressable content items. The allocations of the contents items may also comply with various timing, geographical, delivery, slot inventory-related, and/or campaign specified constraints.

24 Claims, 11 Drawing Sheets

(56) References Cited

U.S. PATENT DOCUMENTS

| | | | | |
|---|---|---|---|---|
| 2002/0013948 A1* | 1/2002 | Aguayo, Jr. | H04N 21/43615 | 348/E7.071 |
| 2002/0078444 A1* | 6/2002 | Krewin | H04N 21/812 | 725/35 |
| 2003/0070167 A1* | 4/2003 | Holtz | G06F 16/958 | 705/14.69 |
| 2003/0101451 A1* | 5/2003 | Bentolila | G06Q 30/0271 | 725/35 |
| 2008/0307454 A1* | 12/2008 | Ahanger | H04N 21/854 | 725/36 |
| 2009/0187939 A1* | 7/2009 | Lajoie | H04N 7/17318 | 725/87 |
| 2010/0146542 A1* | 6/2010 | Weihs | H04N 21/2668 | 725/34 |
| 2010/0153994 A1* | 6/2010 | Alexander | H04N 21/44204 | 725/35 |
| 2010/0162288 A1* | 6/2010 | Huffman | H04N 21/812 | 725/22 |
| 2014/0109123 A1* | 4/2014 | Balakrishnan | H04N 21/433 | 725/14 |
| 2014/0150016 A1* | 5/2014 | Feng | G06Q 30/0255 | 725/34 |
| 2016/0316241 A1* | 10/2016 | Hirsch | H04N 21/4405 | |
| 2016/0330524 A1* | 11/2016 | Wang | H04N 21/4826 | |
| 2017/0262894 A1* | 9/2017 | Kirti | G06F 16/285 | |

* cited by examiner

| 402 | 404 | 406 | 408 | 410 | 412 | 414 | 416 |
|---|---|---|---|---|---|---|---|
| | Description | Target Recipient Characteristics | Constraints | Budget | CPM | Impression Goal | Rank |
| Addressable Content Campaign 1 | Luxury Items | High Income Households | Send to residents of California | 30,000 | 15 | 2,000,000 | 3 |
| Addressable Content Campaign 2 | Domestic Travel | Car Owners | | 216,000 | 36 | 6,000,000 | 2 |
| Addressable Content Campaign 3 | Refinancing Mortgage | | Send during 10-11 am and 6-11 pm | 280,000 | 42 | 6,666,667 | 1 |

FIG. 4

| 502 | 504 | 506 | 508 | 510 | 512 |
|---|---|---|---|---|---|
| | Description | Constraints | Budget Per 1000 Insertions | No. of Insertions Requested | Rank |
| Non-addressable Content Campaign 1 | Public Service Announcement | Deliver in Lewisville, TX from July 1-10, 2020 | 10 | 1,000,000 | 2 |
| Non-addressable Content Campaign 2 | Eat California Nuts | Deliver between 7 am to 5 pm | 30 | 2,000,000 | 1 |
| Non-addressable Content Campaign 3 | Lower Car Insurance | Deliver with TV series with rating higher than 10% | 2 | 3,000,000 | 3 |

FIG. 5

| User | Salary > $100K | Dog Owner | Car Owner | Likes Cooking | Has Children | Sports Fan | Watches TV from 10-11pm | Watches TV from 9-10pm | User Group |
|---|---|---|---|---|---|---|---|---|---|
| 1 | 0 | 0 | 1 | 1 | 1 | 1 | 1 | 0 | A |
| 2 | 1 | 1 | 1 | 0 | 0 | 1 | 0 | 1 | B |
| 3 | 1 | 1 | 1 | 0 | 0 | 0 | 0 | 1 | B |
| 4 | 0 | 1 | 0 | 1 | 0 | 1 | 0 | 1 | B |
| 5 | 0 | 0 | 0 | 1 | 1 | 1 | 1 | 0 | A |
| 6 | 0 | 1 | 1 | 0 | 1 | 1 | 0 | 1 | A |
| 7 | 1 | 1 | 1 | 1 | 1 | 1 | 0 | 1 | B |
| 8 | 0 | 0 | 1 | 1 | 0 | 1 | 1 | 0 | A |

| Available Content Slot ID | Day | Start time | End Time | Service |
|---|---|---|---|---|
| 1 | 6/30/2020 | 7:55:00 AM | 7:55:45 AM | XYZ |
| 2 | 6/30/2020 | 10:55:00 AM | 10:55:45 AM | XYZ |
| 3 | 6/30/2020 | 1:55:00 PM | 1:55:45 PM | XYZ |
| 4 | 6/30/2020 | 7:55:00 PM | 7:55:45 PM | XYZ |

FIG. 9

| Available Content Slot ID | Day | Start time | End Time | Service | Number of targeted views for Addressable Content Campaign Alpha for luxury items | Number of targeted views for Addressable Content Campaign Beta for travel | Number of targeted views for Addressable Content Campaign Gamma for home mortgages | Rank |
|---|---|---|---|---|---|---|---|---|
| 1 | 6/22/2020 | 7:55:00 AM | 7:55:45 AM | XYZ | 200,000 | 100,000 | 150,000 | 4 |
| 2 | 6/22/2020 | 10:55:00 AM | 10:55:45 AM | XYZ | 700,000 | 100,000 | 500,000 | 2 |
| 3 | 6/22/2020 | 1:55:00 PM | 1:55:45 PM | XYZ | 450,000 | 100,000 | 50,000 | 3 |
| 4 | 6/22/2020 | 7:55:00 PM | 7:55:45 PM | XYZ | 1,000,000 | 400,000 | 900,000 | 1 |

FIG. 10

| Available Content Slot ID | Day | Start time | End Time | Service | Predicted quantity of Targeted Recipients of Addressable Content Campaign 1 | Predicted quantity of Targeted Recipients of Addressable Content Campaign 2 | Predicted quantity of Targeted Recipients of Addressable Content Campaign 3 | Rank |
|---|---|---|---|---|---|---|---|---|
| 1 | 6/30/2020 | 7:55:00 AM | 7:55:45 AM | XYZ | 200,000 | 200,000 | 200,000 | 4 |
| 2 | 6/30/2020 | 10:55:00 AM | 10:55:45 AM | XYZ | 800,000 | 100,000 | 500,000 | 2 |
| 3 | 6/30/2020 | 1:55:00 PM | 1:55:45 PM | XYZ | 450,000 | 100,000 | 100,000 | 3 |
| 4 | 6/30/2020 | 7:55:00 PM | 7:55:45 PM | XYZ | 700,000 | 300,000 | 1,000,000 | 1 |

| Scheduled Content Slot ID | Day | Start time | End Time | Service | Quantity of Insertions for Non-addressable Content Campaign 1 | Quantity of Insertions for Non-addressable Content Campaign 2 | Quantity of Insertions for Non-addressable Content Campaign 3 | Quantity of Insertions for for Addressable Content Campaign 1 (No. of Predicted Targeted Recipients for Addressable Content Campaign 1) | Quantity of Insertions for for Addressable Content Campaign 2 (No. of Predicted Targeted Recipients for Addressable Content Campaign 2) | Quantity of Insertions for for Addressable Content Campaign 3 (No. of Predicted Targeted Recipients for Addressable Content Campaign 3) | Total number of Insertions for the slot |
|---|---|---|---|---|---|---|---|---|---|---|---|
| 1 | 6/30/2020 | 7:55:00 AM | 7:55:45 AM | XYZ | 0 | 0 | 0 | 0 | 0 | 0 | 0 |
| 2 | 6/30/2020 | 10:55:00 AM | 10:55:45 AM | XYZ | 0 | 500,000 | 0 | 0 | 0 | 500,000 | 1,000,000 |
| 3 | 6/30/2020 | 1:55:00 PM | 1:55:45 PM | XYZ | 0 | 1,000,000 | 0 | 0 | 0 | 0 | 1,000,000 |
| 4 | 6/30/2020 | 7:55:00 PM | 7:55:45 PM | XYX | 0 | 0 | 0 | 0 | 0 | 1,000,000 | 1,000,000 |

FIG. 11

HYBRID CONTENT SCHEDULER

BACKGROUND

A content campaign may be implemented by a content delivery system to schedule the delivery of content items for a number of presentations, for a geographical region, and/or a time period. The content items may be delivered to computing devices and users via various content distribution networks and/or computing devices. However, such a content scheduling system may not be able to manage content campaigns that request the content scheduling system to target users with content items according to the targeted users' needs, interests, and/or locations.

SUMMARY

The following summary presents a simplified summary of certain features. The summary is not an extensive overview and is not intended to identify key or critical elements.

Systems, apparatuses, and methods are described for managing the delivery of addressable content items that may target users with certain characteristics. Delivery of the addressable content items may be scheduled based on effectiveness of delivering the addressable content items to the targeted users. The effectiveness may be determined, for example, by predicting whether the targeted users will view the addressable content items (and/or quantities of users that will view the addressable content items) if the addressable content items are delivered during one or more slots of one or more content delivery schedules. To predict quantities of viewers, users may be clustered into user groups, and user groups may be selected based on comparison of user group characteristics and targeted user characteristics. The delivery of addressable content items may be managed with the delivery of non-addressable content items. For example, delivery of addressable and non-addressable content items may be scheduled to maximize or otherwise optimize one or more values associated with combined delivery of addressable and non-addressable content items.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4 shows example addressable content campaigns.

FIG. 5 shows example non-addressable content campaigns.

FIG. 7 shows example demographic data used for determining representative users for a plurality of users.

FIG. 8 shows an example content delivery schedule with available content slots.

FIG. 9 shows example viewership data for an already executed content delivery schedule.

FIG. 10 shows example predicted viewership data.

FIG. 11 shows an example optimized content delivery schedule comprising content items from addressable content campaigns and non-addressable content campaigns.

DETAILED DESCRIPTION

Figure 1:
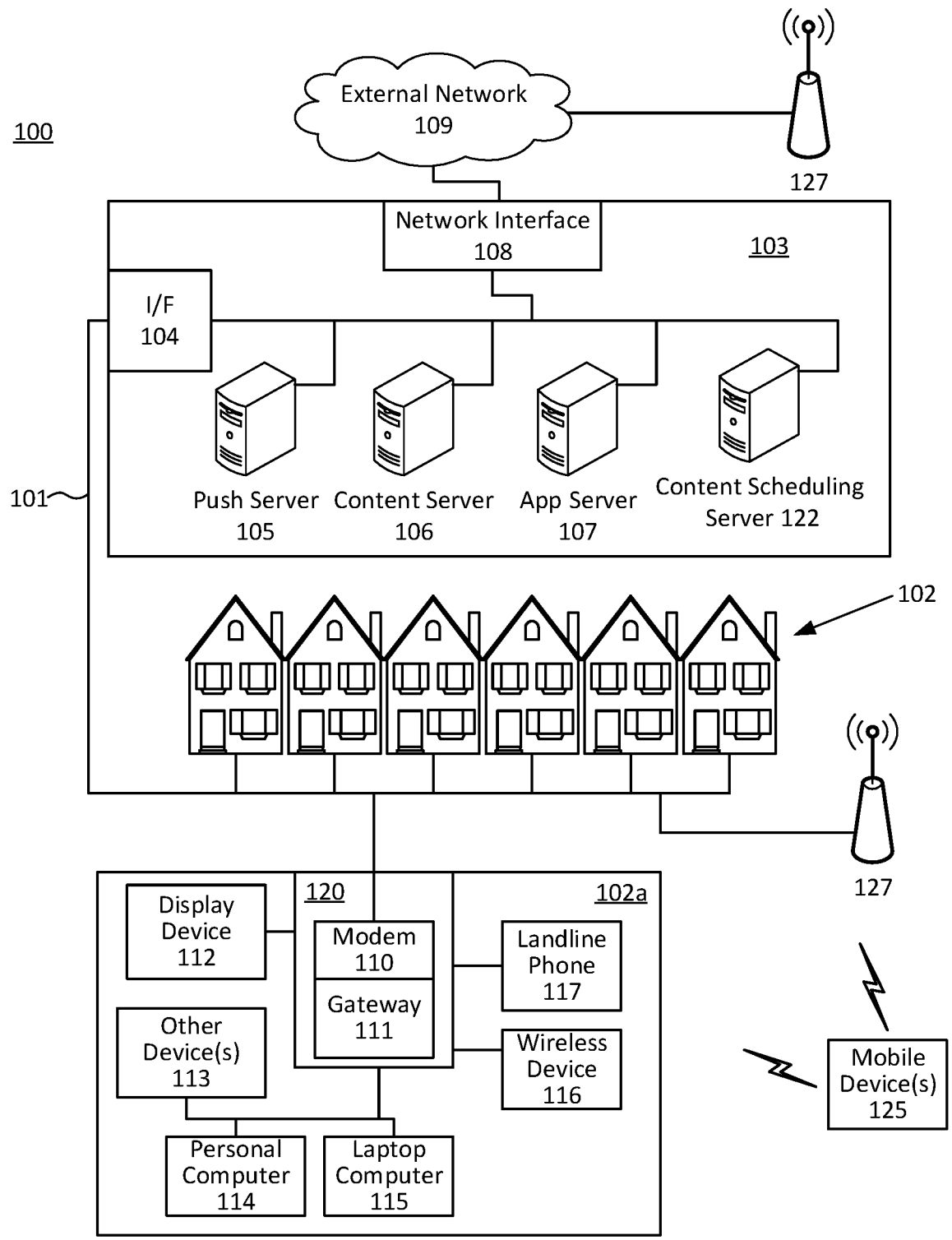
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

Content providers (e.g., broadcasters, platform operators, cable networks, or media representative firms) may provide a variety of different types of primary content items (e.g., sporting events, documentaries, series, news programs, movies, etc.) to users and/or users of the computing devices. The primary content items may be accessible at different locations and/or via different user computing devices (e.g., via smart-TV, tablet, laptop, or smartphone, etc.) and/or network computing devices (e.g., via gateways, set-top boxes, etc.) to the users. The content providers may also provide secondary content items (e.g., advertisements, promotions, infomercials, banners, hyperlinks, public service announcements, etc.) between the showings of different portions of a primary content item or between the showings of two primary content items. The secondary content items may be directly or indirectly related to the primary content items or may be totally unrelated.

Secondary content item providers (e.g., advertisers, retailers, advertisement agencies, and/or advertisement recommendation engines) may request content providers to implement a content campaign for a product or service to deliver secondary content items comprising messages in connection with the product or service to users. The goal of a content campaign may be to accomplish a particular objective or a set of objectives for a product or service. Such objectives may include establishing the product or service, raising awareness of the product or service, increasing a quantity of sales of the product, and/or other objectives. Data for a content campaign for a product or service may comprise secondary content items comprising messages in connection with the product or service, as well as rules, constraints, and/or requirements associated with the delivery of the secondary content items associated with the product or service. For example, the content campaign may specify when the secondary content items may be delivered to users, how often the secondary content items may be delivered to users, locations of targeted users, characteristics of targeted users, etc.

Content providers may follow content delivery schedules that indicate the arrangements and/or the timings of the deliveries of the primary and secondary content items to the users. One or more content scheduling systems may be responsible for assigning the secondary content items to different available slots in the content delivery schedules. A slot may be a period during the delivery of primary content items through a particular service via which secondary content items may be delivered. A service may, for example, comprise and/or otherwise be associated with a source of content. Examples of services may comprise specific content providers (e.g., entities associated with "cable networks" or "broadcast networks," entities providing online streaming and/or download of content, etc.), selectable content collections (e.g., "content channels") assigned by a network operator, and/or any other source of content. For example, a programming stream for a soap opera may have several slots or opportunities (e.g., commercial breaks) to insert secondary content items. Computing devices tuned to a particular service may receive the same secondary content during a slot (e.g., all viewers of a sporting event may watch an advertisement for one of the sponsors of the sporting event featuring one of the players), or may receive different secondary content items (e.g., half of the viewers of a sporting event may view an advertisement for car insurance while the other half may view an advertisement for a cat food product).

A single slot may be associated with a large number of insertions of secondary content items. An "insertion" of a secondary content item may represent a single place, for insertion of the secondary content item, in a stream received by a single device during a slot for secondary content items. For example, if a service makes a primary content item available to one million devices/addresses, a slot in that primary content item may be associated with one million insertions. Those one million insertions may comprise insertions associated with unicast delivery of the primary content item to a portion of the one million devices/addresses, and/or insertions associated with multicast delivery of the primary content item to another portion of the one million devices/addresses. An insertion may or may not be viewed by a user. Continuing with the previous example, a portion of the one million devices/addresses to which the primary content is made available may be turned off or being used to receive other content via other services.

Content scheduling systems may determine different content delivery schedules for different services. Additionally and/or alternately, the content scheduling systems may determine different content delivery schedules for different geographic locations (e.g., separate content delivery schedules for Arlington, VA, and Charlottesville, VA), and/or for different periods (e.g., a day, weekdays, weekends, a week, two weeks, a month, etc.). A content delivery schedule may comprise one or more slots for assigning secondary content items, and each slot may comprise multiple insertion opportunities of the secondary content items in streams to multiple devices.

One type of secondary content items may comprise addressable content items (e.g., addressable advertisements) requested by a addressable content campaign (e.g., an addressable advertisement campaign). The addressable content campaigns may request content providers and/or content scheduling systems to deliver addressable content items to selected users and/or households that are likely to be most receptive to the messages embodied in the addressable content items. The addressable content campaigns may request content providers and/or content scheduling systems to select users at geographic, demographic, and behavioral levels. One way of targeting users may involve selecting addressable content items for the users based on the users' demographic and psychographic characteristics (e.g., an advertisement for an expensive sports car may be wasted if delivered to users who are not able to afford or are otherwise uninterested in such cars). Additionally, the context of the primary content items may not be compatible with the particular types/themes of addressable content items (e.g., a movie having a non-violent theme may not mesh optimally with advertisements for UFC sporting or boxing events, regardless of demographics or geography). Users may receive addressable content items via addressable computing devices (e.g., via smart-TV, tablet, laptop, gateway device, set-top box, or smartphone, etc.) configured to receive insertions of the addressable content items (e.g., in connection with receiving primary content items). A user and/or a household may be associated with a single computing device configured to receive insertions of targeted addressable content items for that particular user or household. For example, a household may comprise a first user, associated with a laptop and interested in cars, who may receive addressable content items about cars via the laptop, and a second user, associated with a smartphone and seeking to book a vacation, may receive addressable content items about vacations via the smartphone. Another type of secondary content items may be non-addressable content items (e.g., linear advertisements) requested by a non-addressable content campaign (e.g., a linear advertisement campaign). A non-addressable content campaign may request non-addressable content items to be scheduled for a specific number of slots in content delivery schedules (e.g., show a linear advertisement for a national car insurance company five times during a sporting event) or a specific number of insertions in various streams of primary content items received by user devices. The non-addressable content campaign may request content items to be scheduled for delivery to computing devices or users in a country, county, or state and/or for a specific period (e.g., showing a linear advertisement for inflatable swimming pools from May to August). Additionally, the non-addressable content campaign may request content items to be scheduled for delivery to all computing devices or users in a specific geographical region (e.g., a linear advertisement about a local coffee shop targeted to residents in the neighborhood the coffee shop is located). The non-addressable content campaign may also request that the delivery be based on ratings of the primary content items to be delivered along with the non-addressable content campaign's content items (e.g., deliver linear advertisements only with primary content items with high ratings). Users may view such non-addressable content items when they tune to a certain content providing service at an appointed time when the content items are being delivered via the service. However, users may miss viewing the non-addressable content items if they are not tuned to the content providing service at the scheduled delivery times of the non-addressable content items. Non-addressable content items (e.g., linear advertisements) may have a very low degree of granularity in terms of targeting users. For example, non-addressable content items may have some degree of applicability to some of the users watching the non-addressable content items. However, the non-addressable content items may often have little or no applicability to a majority of users.

Scheduling only addressable items to be delivered to target users may not be feasible due to limitations in computing resources and/or time. Additionally, not all targeted users scheduled to receive the addressable content items may be available to view the scheduled addressable content items. For example, if an addressable content item is delivered to a thousand users via their computing devices, only a hundred of those thousand users may be available to watch the delivered addressable content items. Therefore, computing resources used for scheduling delivery to the unavailable viewers may be wasted. Content scheduling systems such as those described herein may control and/or facilitate the delivery and/or insertions of addressable content items by delivering addressable content items to targeted users who are predicted to view the addressable content items. A content scheduling system may use past viewership, demographic, psychographic data of users to predict whether certain target users of an addressable content item will view the addressable content item if delivered during certain slots in content delivery schedules. Based on the prediction, the content scheduling system may optimize the placements of the addressable content item in content delivery schedules or delivery of the addressable content items to the target users. When compared to delivering an addressable content items to all targeted users, delivering to a smaller quantity of targeted users who will be available to view the targeted addressable content item may result in less wastage of computing resources of the content scheduling system and/or other systems.

Delivery and/or insertions of non-addressable content items may also be controlled and/or facilitated. A content scheduling system may schedule the delivery of addressable and non-addressable content items for multiple services, multiple geographic locations, and for various periods. For example, a content scheduling system may manage insertions of secondary content items in content delivery schedules for tens (e.g., fifty or more), hundreds, or thousands of services and/or channels that stream primary content items to millions of households, users, and/or computing devices. The above numbers for the services, household, users and computing devices are only examples, and a content scheduling system may schedule insertions of secondary content items for a much larger number of services that deliver primary content items to a larger number of households, users and/or computing devices. A content scheduling system may optimize placements of the addressable content items and the non-addressable content items in content delivery schedules to maximize the returns, effectiveness, and/or viewership of non-addressable content campaigns and addressable content campaigns managed by the content scheduling system.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smartphones, tablets, or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing device(s) configured to send information downstream to, and to receive information upstream from, devices communicating with the local office 103 via the communications links 101. The interface 104 may be configured to manage communications among those devices, to manage communications between those devices and backend devices such as servers 105-107 and 122, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber-optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices associated with the premises 102 and/or to the mobile devices 125. The content server 106 may be configured to provide content to devices associated with the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. The local office 103 may comprise additional servers, such as the content scheduling server 122 (described below), additional push, content, and/or application servers, and/or other types of servers. Although shown separately, the push server 105, the content server 106, the application server 107, the content scheduling server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices associated with the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices associated with the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices associated with the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices associated with the premises 102a, and/or other devices may receive, store, output, and/or otherwise use assets. An asset may comprise a video, a game, one or more images, software, audio, text, webpage(s), and/or other content.

The content scheduling server 122 in the local office 103 (e.g., a headend) may be configured to provide scheduling of secondary content items (e.g., addressable content items and non-addressable content items) along with primary content items provided by content server 106 (or any other content items accessed by the devices 113-117 and 125). For example, the content scheduling server 122 may manage one or more non-addressable content campaigns (e.g., linear advertisement campaigns) and one or more addressable content campaigns (e.g., first advertisement campaigns). The content scheduling server 122 may store and provide content items (e.g., advertisements, promotions, infomercials, banners, etc.) to be presented with content items from the content server 106 to users associated with the premises 101 and/or to the devices 113-117 and 125. The content scheduling server 122 may be responsible for formatting and inserting content items for the non-addressable content campaigns and addressable content in video streams being sent to devices associated with the premises 101 and/or to the devices 113-117 and 125. The content items inserted by the content scheduling server may be targeted to users and/or their devices based on various demographic information, user content consumption history, device capabilities, and configurations, etc.

Figure 2:
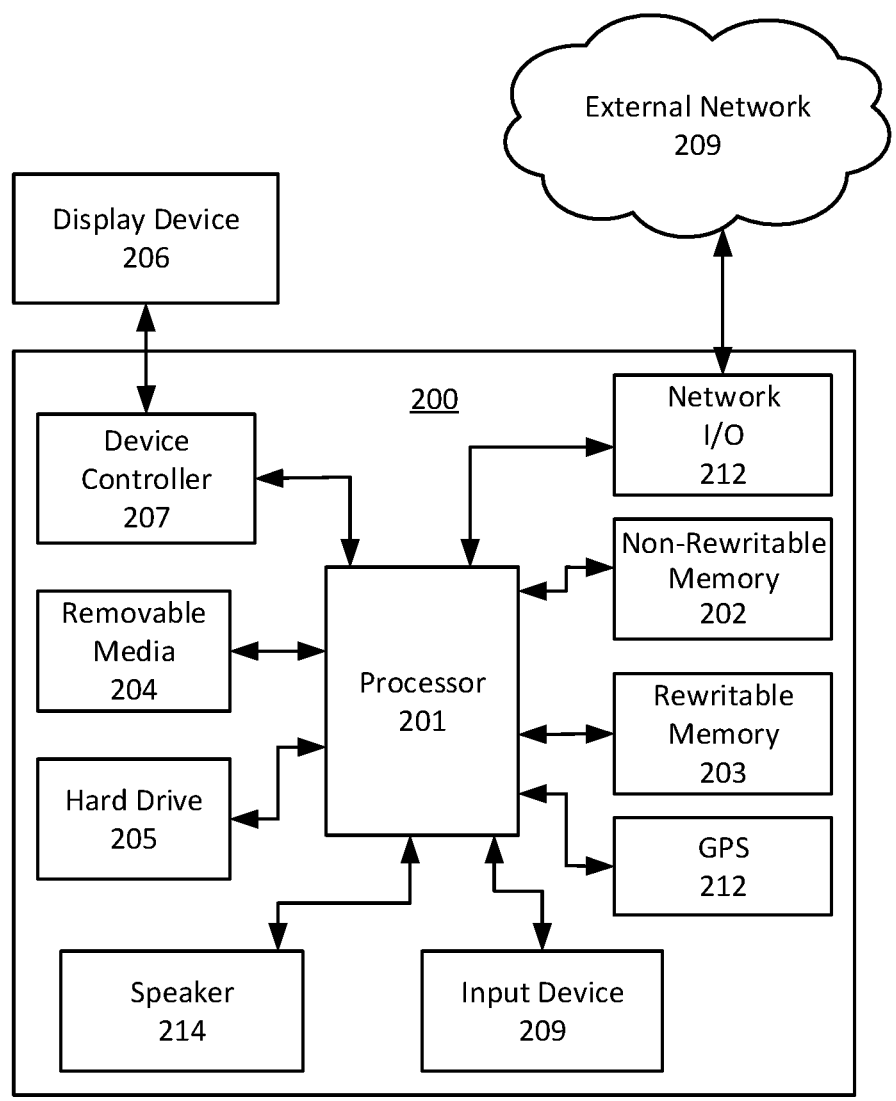
FIG. 2 shows the hardware elements of a computing device.

FIG. 2 shows hardware elements of a computing device 200 that may be used to implement any of the computing devices shown in FIG. 1 (e.g., the mobile devices 125, any of the devices shown associated with the premises 102a, any of the devices shown in the local office 103, any of the wireless access points 127, any devices with the external network 109) and any other computing devices described herein. The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), a microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on the execution of programming instructions read from ROM or RAM, with other operations hardwired into gates or other logic. Further, an IC may be configured to output image data to a display buffer.

Figure 3:
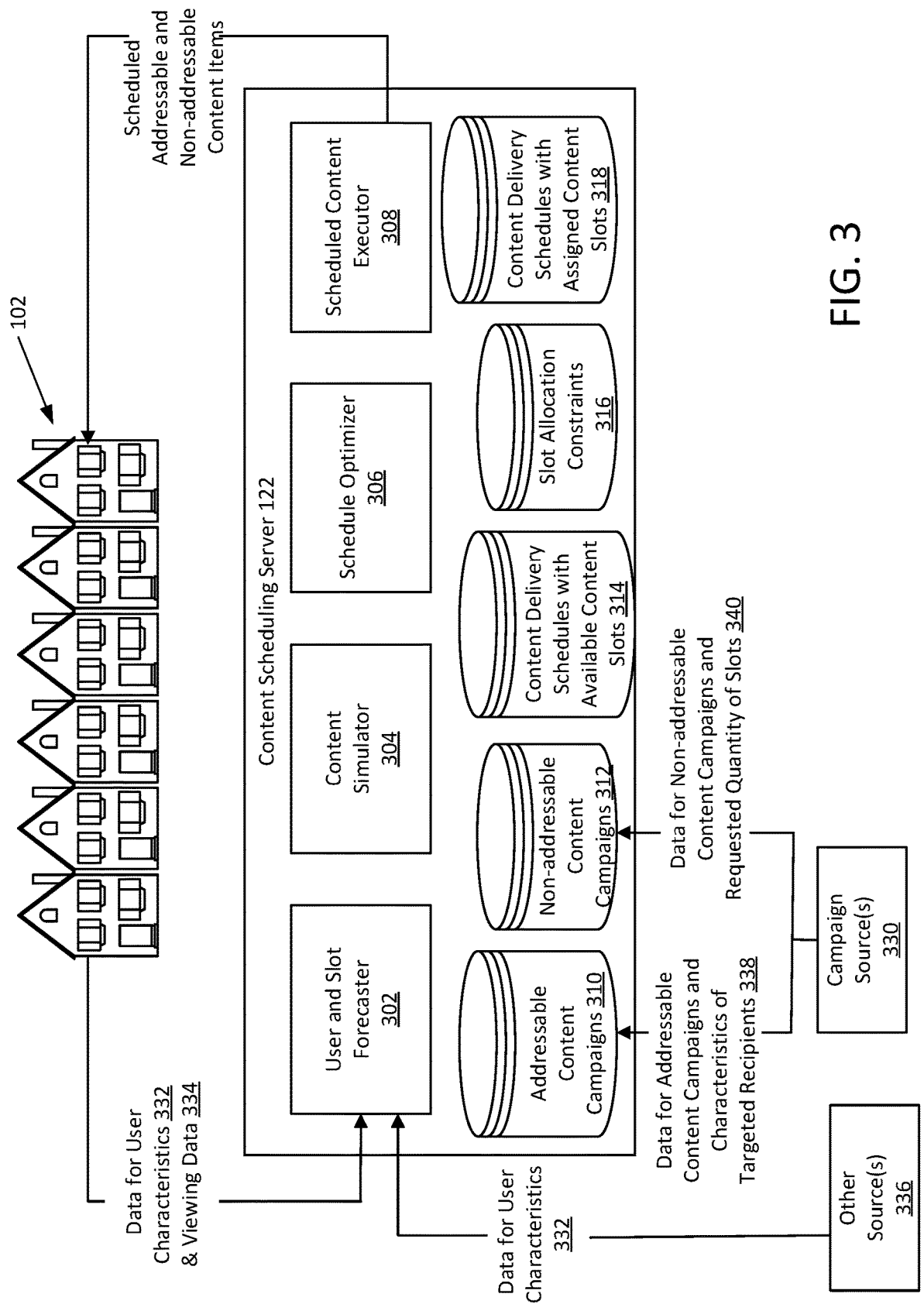
FIG. 3 shows a block diagram showing an example of a content scheduling server for scheduling addressable and non-addressable content items.

FIG. 3 is a block diagram showing additional details of the example content scheduling server 122 in FIG. 1. The content scheduling server 122 may comprise one or more computing device(s). The content scheduling server 122 may be variously configured and include software components such as a user and slot forecaster 302, a content simulator 304, a schedule optimizer 306 and/or a scheduled content executor 308. The content scheduling server 122 may also comprise a addressable content campaigns database 310, a non-addressable content campaigns database 312, a content delivery schedules with available content slots database 314, a slot allocation constraints database 316, and/or a content delivery schedules with assigned content slots database 318. A database may comprise two or more separate databases, and when considered together, still constitute a "database" as that term is used herein. A database may be distributed across a cloud or the Internet. The content scheduling server 122 may be configured to store information regarding available slots for secondary content items in content delivery schedules in the database 314. The information for the available slots may be determined by the content scheduling server 122 and/or the content server 102 in FIG. 1 based on one or more delivery schedules of primary content items. The content scheduling server 122 may be configured to store content delivery schedules for scheduled secondary content items (e.g., linear advertisements and addressable content items) and/or primary content items in the database 318.

The content scheduling server 122 may receive requests to manage content campaigns (e.g., advertisement campaigns) from one or more campaign sources 330. The campaign sources 330 may be retailers, service providers, advertisers, content providers, advertisement agencies handling advertising and promotion of retailers and service providers, and/or advertisement recommendation engines (e.g., COMCAST TECHNOLOGY SERVICES, GOOGLE AD MANAGER, FREEWHEEL, VUBIQUITY, GOOGLE ADS, QUANTIFI DIGITAL, etc.). The content scheduling server 122 may comprise a platform (e.g., a website, a portal, etc.) to enable the campaign sources 330 to provide data 338 for the addressable content campaigns (e.g., information for the addressable content campaigns and characteristics of targeted recipients of the addressable content items of the addressable content campaigns) and data 340 for second advertisement campaigns (e.g., information for second advertisement campaigns and a number of requested insertions).

The content scheduling server 122 may receive requests to manage addressable content campaigns from the campaign sources 330. Addressable content campaigns may comprise a request for the content scheduling server 122 to deliver one or more addressable content items to users (e.g., the users associated with the premises 102 and/or users of devices 113-117 and 125 in FIG. 1). The request may comprise data 338 for addressable content items comprising messages to be delivered in connection with the addressable content campaigns. The data 338 for the addressable content items may comprise, for example, video, audio, text, web pages, images, and/or files of the non-addressable content items. The data 338 may also comprise target recipient characteristics (e.g., information that may be used by the content scheduling server to target the addressable content items to certain users with certain geographical, demographic and/or psychographic traits that may find the messages in the addressable content items relevant). FIG. 4 shows example information received for three addressable content campaigns. The information may comprise a unique identifier 402 and a description 404 for each of the addressable content campaigns (e.g., the addressable content campaign 1 is an advertisement campaign for luxury items).

Each addressable content campaign may be associated with an impression goal 414. An impression may be a metric used to quantify a number of deliveries of the addressable content items to users targeted by the content scheduling sever 122. For example, an impression may comprise the delivery of a addressable content item to a target viewer (and/or target household) meeting target criteria specified by a addressable content campaign. An impression may also or alternatively comprise delivery of a addressable content item to a device and/or network address associated with target viewer and/or household (e.g., delivery to a device and/or address may be used as a proxy for delivery to a viewer and/or household associated with that device and/or address). In the example of FIG. 5, the addressable content campaign 1 may have a goal to deliver the addressable content items to 2,000,000 users and/or households that are likely to be most receptive to the messages embodied in the addressable content items (e.g., addressable content items for the addressable content campaign 1 for luxury items is to be delivered to high-income users and/or households). Each addressable content campaign may also be associated with a budget 410 for the addressable content campaign and a cost per mille (CPM) 412 (i.e., the cost per thousand impressions). The content scheduling server 122 may assign a rank 416 to the received addressable content campaigns. For example, the content scheduling server 122 may rank the addressable content campaigns by the overall budget of the addressable content campaigns, the impression goals, the CPM, the popularities of the product/services advertised in the addressable content items, the size of the business and/or organization that have requested the addressable content campaigns, and/or other bases.

The addressable content campaigns may be associated with geographic, timing, and/or delivery constraints 408 (e.g., content items for addressable content campaign 1 will be delivered to California residents, content items for the addressable content campaign 3 will only be delivered between 6 to 11 pm, etc.). The addressable content campaigns may be associated with demographic, and psychographic characteristics of targeted recipients of the campaign 406 (e.g., content items for addressable content campaign 1 will be delivered to high-income users, content items for the addressable content campaign 2 will only be delivered to car owners, etc.). The content scheduling server 122 may store the information and/or data for the addressable content campaigns in the addressable content items database 310. The addressable content items database 310 may be configured, for example, to store the data (e.g., video, audio, text, web pages, images, and/or files) for the content items of the addressable content campaigns managed by the content scheduling server 122 and other information (e.g., the identifier 402, the description 404, the characteristics of targeted recipients 406, the constraints 408, the budget 410, the CPM 412, the impression goal 414, the rank 416, etc.) regarding the addressable content campaigns. The addressable content items database 310 may be configured to store other information of the addressable content campaigns that may be necessary for the functionality of the content scheduling server 122.

The content scheduling server 122 may also receive requests to manage non-addressable content campaigns from one or more campaign sources 330. A non-addressable content campaign may request the content scheduling server 122 to deliver one or more non-addressable content items to users (e.g., the users associated with the premises 102 and/or users of devices 113-117 and 125 in FIG. 1). The request may comprise data for non-addressable content items comprising messages to be delivered in connection with the non-addressable content campaigns (e.g., to the users associated with the premises 102 and/or users of devices 113-117 and 125 in FIG. 1). The data for the non-addressable content items may comprise, for example, video, audio, text, web pages, images, and/or files of the non-addressable content items. The request may also comprise information associated with the non-addressable content campaign. FIG. 5 shows example information received for three example non-addressable content campaigns that may be received by the content scheduling server 122. The information may comprise a unique identifier 502 and a description 504 for the non-addressable content campaigns (e.g., the non-addressable content campaign 3 is an advertisement campaign for car insurance). The information may also comprise a quantity of insertions 510 requested by the non-addressable content campaigns in the content delivery schedules (e.g., the non-addressable content campaign 3 has requested 3,000,000 insertions) and the budget 508 for the non-addressable content campaign (e.g., the cost per thousand insertions is $2 for the non-addressable content campaign 3). The information may also comprise geographical, timing and/or delivery constraints 506 for the non-addressable content campaigns (e.g., content items for non-addressable content campaign 1 can only be delivered to residents in Lewisville, TX from Jul. 1-10, 2020, content items for non-addressable content campaign 2 can only be delivered to users between 7 am to 5 pm, content items for non-addressable content campaign 3 can only be delivered with TV series with a Nielson rating higher than 10%, etc.) The content scheduling server 122 may rank the received non-addressable content campaigns. For example, the content scheduling server 122 may rank the received non-addressable content campaigns based on the overall budgets of the non-addressable content campaigns, the budgets per thousand insertions of the non-addressable content items, the budgets per million insertions of the non-addressable content items, the popularities of the product/services advertised in the non-addressable content items, the sizes of the businesses and/or organizations associated with the non-addressable content campaigns, and/or other bases.

The content scheduling server 122 may store the information and/or data for the non-addressable content campaigns in the non-addressable content items database 312. The non-addressable content items database 312 may be configured, for example, to store the data (e.g., video, audio, text, web pages, images, and/or files) for the content items of the non-addressable content campaigns managed by the content scheduling server 122 and other information (e.g., the identifier 502, the description 504, the constraints 506, the budgets 508, the number of insertions requested 510, the rank 512, etc.) regarding the non-addressable content campaigns. The non-addressable content items database 312 may be configured to store other information of the non-addressable content campaigns that may be necessary for the functionality of the content scheduling server 122.

Referring back to FIG. 3, the user and slot forecaster 302 in the content scheduling server 122 may receive viewing data 334, and demographic and psychographic data 332 associated with the multiple premises 102 and/or the users associated with the premises 102 and/or from other source(s) 334. Based on the received viewing data 334, and the received demographic, and psychographic data 332, the user and slot forecaster 302 may predict the future content viewing behaviors of the users associated with the premises 102 based on the past content viewing behaviors of the users in the received viewing data 334. The future content viewing behaviors may be predicted for users of different geographical regions, for different types of content deliveries (e.g., linear or broadcast content, video-on-demand, streaming media, etc.), for different services (e.g., NBC, ABC, CNN, HGTV, etc.), and/or for different time periods (e.g., hours of the day, weekdays, weekends, etc.). The user and slot forecaster 302 may also determine a group of users that are representative of the users in the multiple premises 102 and/or users of devices 113-117 and 125 in FIG. 1.

The content simulator 304 in the content scheduling server 122 may predict impressions or a quantity of targeted recipients of addressable content campaigns that can be achieved by the addressable content campaigns in the addressable content campaigns database 312 for various available content slots for secondary content items in the content delivery schedules stored in the database 314. The representative content simulator 304 may be configured to simulate an environment where real-time decisions may be made to target addressable content items from the addressable content campaigns at one or more users from a group of users that are representative of the users in the multiple premises 102 and/or users of devices 113-117 and 125 and determined by the user and slot forecaster 302. The real-time decisions may be made based on the future content viewing behaviors predicted by the user and slot forecaster 302.

Based on the predicted impressions of the addressable content campaigns, the schedule optimizer 306 in the content scheduling server 122 may assign non-addressable content items from the non-addressable content campaigns and addressable content items from the addressable content campaigns to insertions associated with various available slots for secondary content items. The scheduling optimizer 306 may allocate the non-addressable content items and the addressable content items to maximize returns, effectiveness, and/or viewership of the non-addressable content campaigns and the addressable content campaigns. The scheduling optimizer 306 may allocate the non-addressable content items and the addressable content items in the available insertions associated with the content slots of the content delivery schedules based on and/or complying with slot allocation constraints in the slot allocation constraints database 316, and/or the constraints specified by the addressable and non-addressable content campaigns (e.g., the constraints 406 for the addressable content campaigns in FIG. 4 and the constraints 506 for the non-addressable content campaigns in FIG. 5). The scheduling optimizer 306 may store data indicating the final content delivery schedules with insertions of the content slots assigned to various content items from the addressable and non-addressable content campaigns in the content delivery schedules database 318. The schedule optimizer 306 in the content scheduling server 122 may also determine insertions of the assigned addressable and non-addressable content items in various streams (e.g., unicast streams, multicast streams, etc.) that will be received by computing devices (e.g., via smart-TV, tablet, set-top box, or smartphone, etc.) associated with the premises 102 and/or users of the devices associated with the premises 102.

The scheduled content executor 308 in the content scheduling server 122 may be configured to access the optimized content delivery schedules stored in the content delivery schedules with assigned content slots database 318. The scheduled content executor 308 may also be configured to execute the delivery of the addressable content items and the non-addressable content items assigned to different slots in the optimized content delivery schedules to the users in the multiple premises 102 and/or users of devices 113-117 and 125. The scheduled content executor 308 may deliver the addressable content items and the non-addressable content items via multicast and/or unicast streams. The scheduled content executor 308 may send additional information regarding the addressable content items and the non-addressable content items to computing devices (e.g., via smart-TV, tablet, set-top box, or smartphone, etc.) associated with the premises 102. The additional information may comprise a title of the content items and/or descriptive information for the content items.

While the content simulator 304 may simulate an environment where addressable content items are targeted for all possible users to accurately predict the impressions or a number of targeted recipients that will view the addressable content items, such a large scale simulation may not be practical due to limitations in computing resources and/or time. The user and slot forecaster 302 may determine a subset of users that are representative of a larger population of users. The content simulator 304 may, based on the determined subset, determine a quantity of targeted recipients of the addressable content items without compromising the accuracy of the predicted impressions.

Figure 6A:
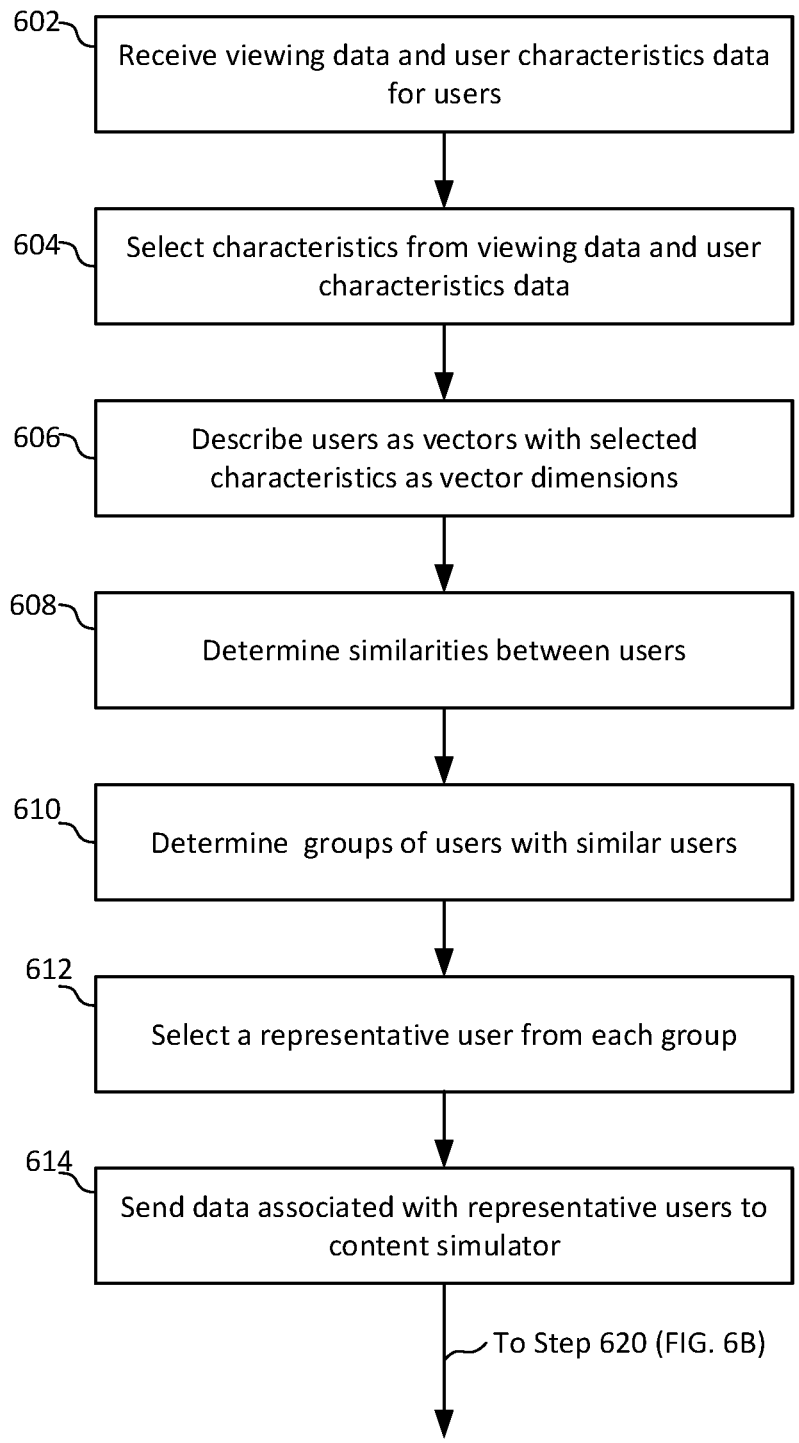
FIGS. 6A, 6B, and 6C are a flow chart showing an example method for scheduling content items from addressable and non-addressable content campaigns.
Figure 6B:
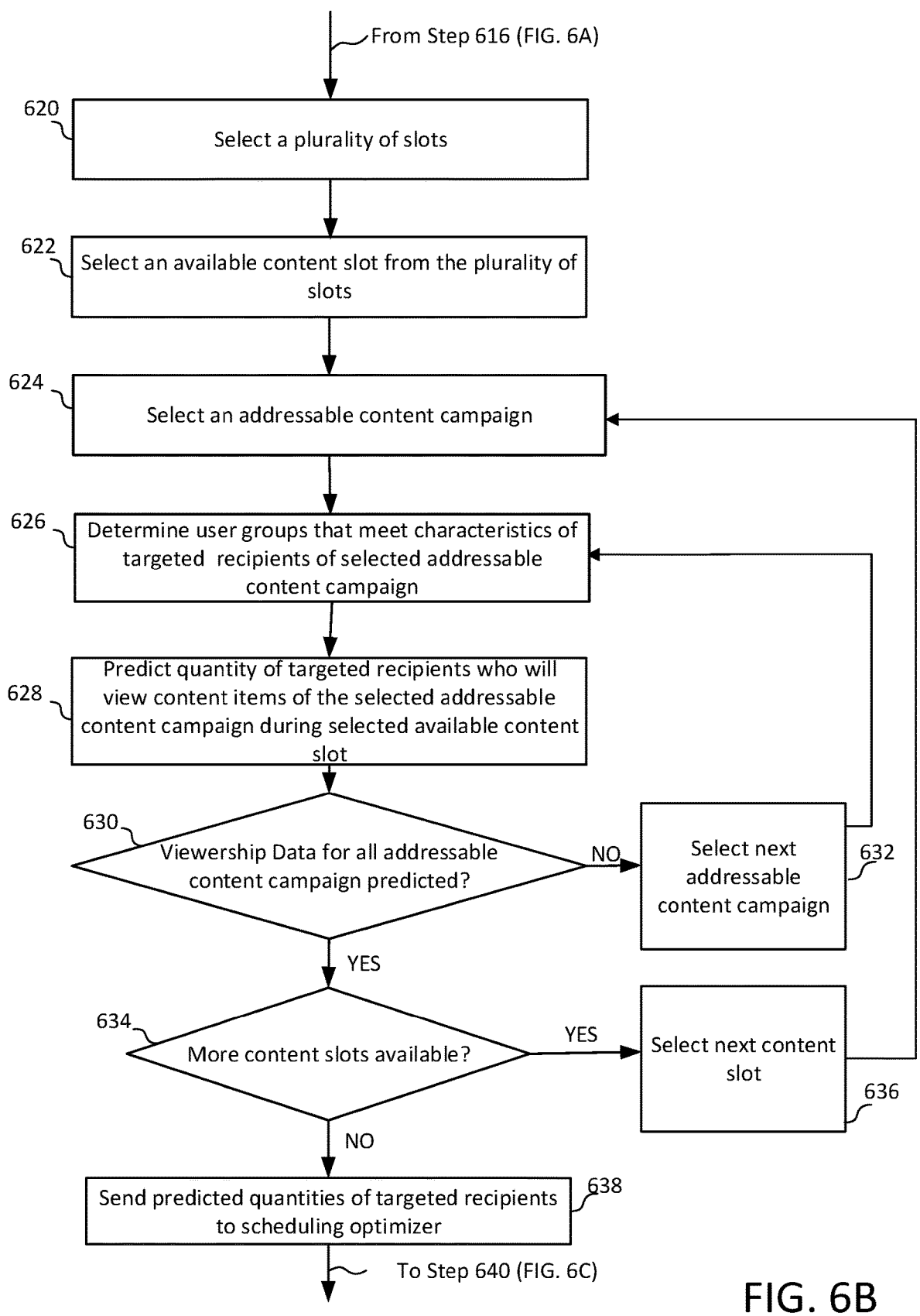
Figure 6C:
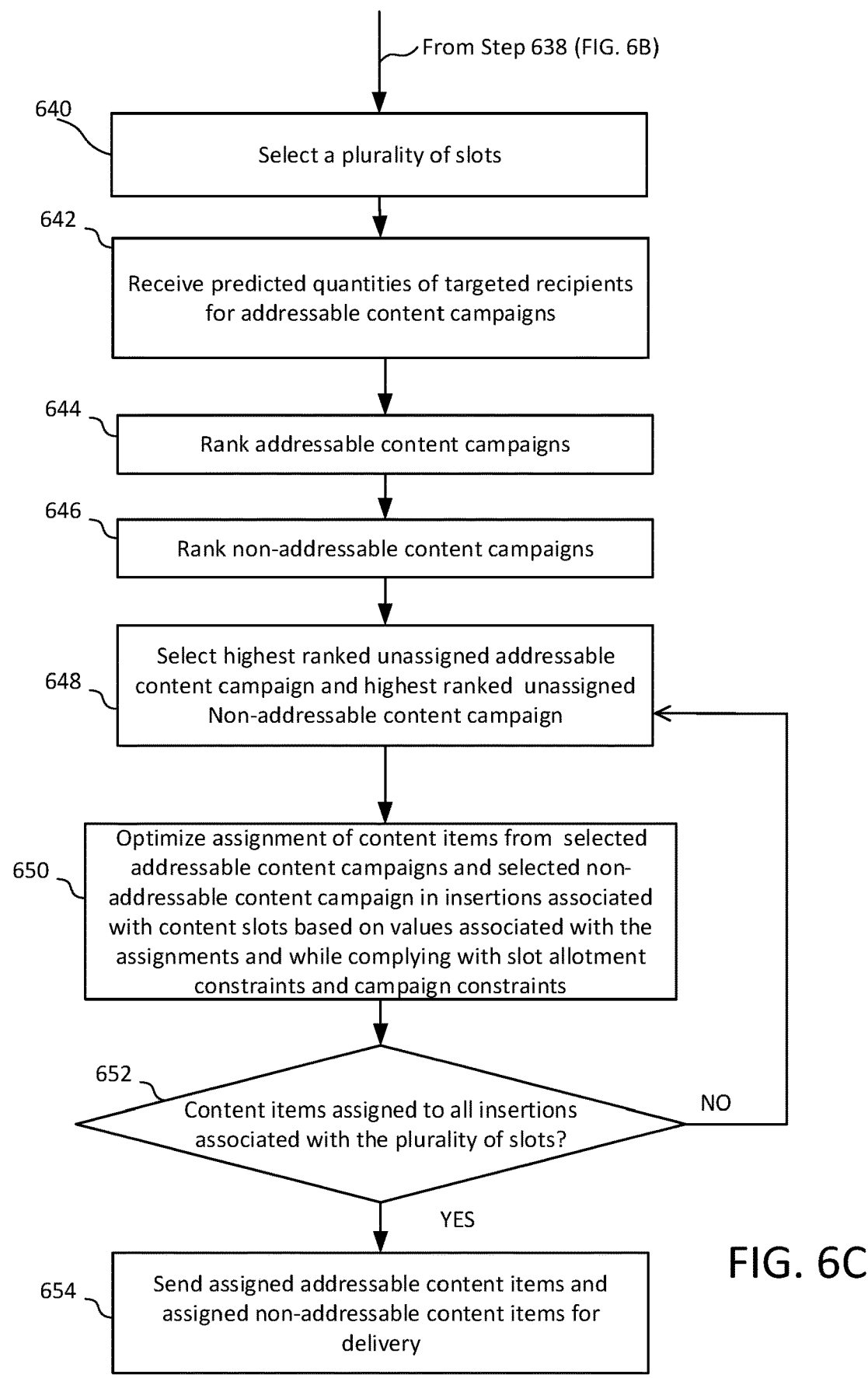

FIGS. 6A, 6B, and 6C are a flow chart showing an example method for scheduling secondary content items from one or more addressable content campaigns and one or more non-addressable content campaigns in content delivery schedules by the content scheduling server 122. The steps in FIGS. 6A, 6B, and 6C may be performed by various software components of the content scheduling server 122, such as the user and slot forecaster 302, the content simulator 304, and/or the schedule optimizer 306 in FIG. 3. One, some, or all steps of the method may also or alternatively be performed by one or more other computing devices. One, some, or all of the steps may be rearranged or otherwise modified. Steps may be omitted and/or other steps added.

In one or more steps of the portion of the method shown in FIG. 6A, representative users, of a much larger group of users, as well as future content viewing patterns and/or behaviors of the larger group of users, may be determined by a user and slot forecaster, such as the user and slot forecaster 302 in the content scheduling server 122 in FIG. 3. At step 602, the user and slot forecaster may receive viewing data (e.g., the viewing data 334 in FIG. 3) and user characteristics data (e.g., the demographic, and/or psychographic data 332 in FIG. 3) associated with a population (or other groups) of users. The user and slot forecaster may receive the data via computing devices (e.g., the devices 113-117) of users associated with the premises 102 and/or from other sources 334 in FIG. 3. The computing devices (e.g., the devices 113-117) may be configured for monitoring content viewing habits of users and collecting information from that monitoring for use by the content scheduling server 122. The other source(s) 334 may comprise, for example, textual input data, clickstream data, past-purchase information, survey response data, population and housing censuses, and/or education, health, and employment statistics. The textual input data may comprise electronic communications submitted by the users (e.g., social media posts, product reviews, blogs, articles, papers, email messages, text messages, etc.). The clickstream data may comprise information related to what webpages a user visits, how long he/she remains on a web page, hyperlinks selected, and generally, any information related to a succession of selections made by the user (e.g., mouse clicks, touch selections, etc.). The past-purchase information may comprise data indicating a number of purchases completed by a user as well as data identifying the purchased items. The survey response data may comprise responses provided by a user in response to one or more questionnaires.

The demographics data associated with the population of users may comprise data indicating, for a population on an individual and/or group basis, one or more of age, gender, sexual orientation, race, marital status, number and/ages of children, occupation, income, education level, political affiliation, religious affiliation, nationality, and/or any other characteristics. The demographic data for a user may be determined, e.g., based on a ZIP code, a geographic location, and/or any other data associated with that user and/or other users. The psychographic data associated with the population of users may comprise, for some or all of the population, personal preferences, opinions on certain products, interests, activities, lifestyles, subject matter expertise, etc. The viewing data associated with the population of users may comprise data indicating, on an individual and/or group basis, content viewing history of the individual/group, frequently viewed genres of content items by the individual/group, viewing times associated with the different genres, and/or other content viewing characteristics. For example, viewing data for a user may show that the user may start watching content items after 9:30 PM on a weekday, but the user may start watching content items around 11 AM on weekends. The viewing data may comprise of viewing history of various services. The viewing data may also or alternatively be based on most frequently viewed services, geographic regions, the subject matter of content items, and/or other data.

The user and slot forecaster may determine a subset of representative users, from a set of users, by clustering users with similar content viewing and user characteristics. For example, the user and slot forecaster may cluster users with similar geographic, demographic, and/or psychographic characteristics, and/or similar content viewing characteristics. Many algorithms may be used for clustering (e.g., for operations associated with steps 604-612). Those algorithms may, for example, comprise traditional methods such as factor analysis or the k-means clustering algorithm, neural network-based methods, such as Kohenen networks and/or p-median clustering, and/or other methods.

At step 604, the user and slot forecaster may select one or more geographic, demographic, psychographic, and/or content viewing characteristics of the users based on the user characteristics data and/or the viewing data received for the users at step 602. The user and slot forecaster may select all or some of the geographic, demographic, psychographic, and/or content viewing characteristics arbitrarily or based on user characteristics targeted by the addressable content campaigns. The geographic, demographic, psychographic, and/or content viewing characteristics may be determined by using any suitable technique such as machine learning-based models. Examples of machine learning-based models include regression-based models, neural network-based models, and/or fully-connected network-based models. The machine learning-based models may be configured or trained to predict the geographic, demographic, psychographic, and/or content viewing characteristics of the users. For example, machine learning-based models may analyze a user's purchasing behavior to detect multiple and regular purchases of baby food and determine that the user is a parent. The machine learning-based models may be configured or trained to predict the geographic, demographic, psychographic, and/or content viewing characteristics of the users at various levels of granularities. For example, the machine learning-based models may determine that two users are parents when one of the users regularly purchases baby food, and the other user regularly purchase clothes for teenagers. In another example, the machine learning-based models may determine that the user who regularly purchases baby food is a parent of a baby, and the other user who regularly purchases clothes for teenagers is a parent of a teenager.

At step 606, the user and slot forecaster may associate, or describe each user as a multi-dimensional vector where each dimension of the vector represents a geographic, demographic, psychographic, and/or content viewing characteristics of the users selected at step 604. FIG. 7 shows 8-dimension vectors for eight example users 1-8 whose geographic, demographic, psychographic, and/or content viewing characteristics may be described "0"s or "1"s for each of eight dimensions ("salary>$100K," "dog owner," "car owner," "likes cooking," "has children," "sports fan," "watches TV from 10-11 pm," and "watches TV from 9-10 pm"). The positions of the "1"s and "0"s may represent the various geographic, demographic, psychographic, and/or content viewing characteristics of the users. The value "1" for a particular dimension of a vector representing a user may represent that the user has a characteristic corresponding to that particular dimension. A "0" may represent that the user does not have the corresponding characteristic. Although FIG. 7 describes the users by eight-dimension vectors, vectors having more or fewer dimensions may be used to describe or represent the users.

Referring back to FIG. 6A, at step 608, the user and slot forecaster may determine the similarities between the users. The similarities between two users (e.g., users 1 and 2 in FIG. 7) represented by vectors V1 (e.g., [0, 0, 1, 1, 1, 1, 1, 0] for user 1 in FIG. 7) and V2 (e.g., [1, 1, 1, 0, 0, 1, 0, 1] for user 2 in FIG. 7) respectively may be determined by determining the distance between the two vectors. For example, the similarities between the two users represented by the vectors V1 and V2 can be estimated by:

$$\text{Similarty} = \sqrt{\Sigma_{i=1}^{i=D}((V1_i - V2_i)^2 * \text{weight}_i)^2}$$

where D is the dimension of the vectors V1 and V2 (e.g., vectors V1 and V2 in FIG. 7 are 8-dimension vectors), $V1_i$ is the value (e.g., "0" or "1") for an $i^{th}$ dimension of vector V1 (e.g., $V1_1=0$ for the user 1 in FIG. 7), $V2_i$ is the value for an $i^{th}$ dimension of vector V2 (e.g., $V2_1=1$ for the user 2 in FIG. 7) and $\text{weight}_i$ is a weight associated with an $i^{th}$ dimension of the vectors, where the $\text{weight}_i$ may represent the importance of the characteristics associated with the $i^{th}$ dimension of the vectors when determining the similarities between users. The weights may be assigned based on user characteristics targeted by the addressable content campaigns and/or other bases.

At step 610, the user and slot forecaster may divide the users into user groups of similar users. For example, a user group may comprise a group of users for which associated vectors are more similar to (e.g., have smaller vector distances from) vectors associated with other users in the same user group (and/or to a vector based on vectors associated with other users in the same group) than to vectors associated with users in one or more other user groups (and/or to vectors based on vectors associated with users in one or more other user groups). For example, the users listed in FIG. 7 may be assigned either to user group A or user group B; the users 1, 5, 6, and 8 who are sports fans and view primary content items from 10-11 pm may be assigned to user group A, and the users 2, 3, 4, and 7 who have dogs as pets and are car owners may be assigned to user group B. The user and slot forecaster may, for example, determine user groups of similar users by using the K-means clustering algorithm. Using the K-means clustering algorithm may enable each user to be assigned to a user group (e.g., a cluster) such that the distance between the user and a center or centroid of that assigned user group is less than distances between the user and centroids of other user groups. The centroids for a user group of users can be determined by averaging the vectors of the users in that group. Vectors may be averaged by, for example, computing an average value for each vector dimension based on the vectors of those users (e.g., an average of vectors for a user group consisting of users 1, 5, 6, and 8 of FIG. 7 may be [0, 0, ½, 1, ¾, 1, 1, 0]). A K-means clustering algorithm may be configured to determine a pre-selected quantity (K) of user groups, randomly select K data points to be the centroids of the user groups, assign users to one of the K user groups based on the closest centroids, recalculate the centroids of the user groups after the assignments, and keep iterating the assignment of the users to the user groups and recalculating the centroids of the user groups until there is no change to the centroids or the changes in the centroids is less than a predetermined threshold. The K-means clustering algorithm may be configured to determine K user groups based on a predetermined sampling rate and/or based on a maximum cluster size.

User groups may also or alternatively be determined in other ways. For example, a user group of similar users may comprise a group of users for which, as to any arbitrary pair of users in that group, a similarity between vectors for the two users of that pair satisfies a threshold (e.g., a vector distance between the vectors may be less than, or less than or equal to, a threshold distance). Also or alternatively, a user group of similar users may comprise a group of users for which, as to an arbitrary user in that group, a similarity between a vector for that user and a vector for a baseline theoretical viewer (e.g., theoretical viewer having a "1" for all dimensions of interest) satisfies a threshold.

At step 612, the user and slot forecaster may select a representative user from each group. The representative user from a user group may be a user of the user group for which an associated vector has the smallest distance from the centroid of the group. The distance between each user with vector V and the centroid with vector C may be estimated by:

$$\text{Similarty} = \sqrt{\Sigma_{j=1}^{j=D}((V_j - C_j) * \text{weight}_j)^2}$$

where D is the dimension of the vectors V and C, $V_j$ is the value (e.g., "0" or "1") for a $j^{th}$ dimension of vector V, $C_j$ is the value for a $j^{th}$ dimension of vector C (e.g., $C_1=0$ for the centroid [0, 0, ½, 1, ¾, 1, 1, 0] of user group A) and $\text{weight}_3$ is a weight associated with a $j^{th}$ element in the vectors. The $\text{weight}_j$ may represent the importance of the characteristics of the $j^{th}$ dimension of the vectors when determining the similarities between the representative users and the centroid. The weights may be assigned based on user characteristics targeted by the addressable content campaigns, similar to weights used in step 608 to determine similarities between users, and/or other bases. For example, either users 1, 5, or 6 may be chosen as the representative user for user group A as they are all equidistant from the centroid of user group A.

At step 614, the user and slot forecaster may send data associated with the determined representative users to a content simulator. The user and slot forecaster may intermittently send the data associated with determined representative users to the content simulator and/or when requested by the content simulator.

A content scheduling system, such as the content scheduling server in FIG. 1, may predict future viewership data of the users (e.g., impressions that may be achieved by the addressable content campaigns if delivered) based on past viewership data or patterns of the users (e.g., the viewership data gathered from the premises and received by the content scheduling server 122 in FIG. 3 and/or the characteristics of the representative users determined by the user and slot forecaster). The future viewership data of the users may comprise predicted probabilities that users or households will watch non-addressable content items and/or addressable content items delivered during future content slots. The content scheduling system may use forecasted or predicted viewership data, such as the predicted impressions for the addressable content items of the addressable content campaigns, to optimize the placements of the content items from both the addressable and non-addressable content campaigns.

In one or more steps of the portion of the method shown in FIG. 6B, quantities of targeted recipients that will view addressable content items may be predicted for various addressable content campaigns by a content simulator, such as the content simulator 304 in the content scheduling server 122 in FIG. 3. At step 620, the content simulator may select a plurality of content slots. For example, the content simulator may select a content delivery schedule or a portion of a content delivery schedule from the database 314. Alternately, the content simulator may select multiple content delivery schedules with available content slots. The selected plurality of slots may be associated with a particular service. Additionally and/or alternately, the selected plurality of slots may be associated with one or more geographic locations, and/or comprise some or all available slots for different periods (e.g., a day, weekdays, weekends, a week, two weeks, a month, etc.). FIG. 8 shows an example content delivery schedule with four available content slots on Jun. 30, 2020, for a service XYZ. For example, the first available content slot may accommodate one or more secondary content items (e.g., addressable advertisements or linear advertisements) from 7:55:00 AM to 7:55:45 AM, the second available content slot may accommodate one or more secondary content items from 10:55:00 AM to 10:55:45 AM, the third available content slot may accommodate one or more secondary content items from 1:55:00 PM to 1:55:45 PM, and the fourth available content slot may accommodate one or more secondary content items from 7:55:00 PM to 7:55:45 PM.

At step 622, the content simulator may select an available content slot from the selected plurality of slots at step 620 for predicting quantities of targeted recipients of addressable content items from various addressable content campaigns (e.g., predicted impressions for addressable advertisement campaigns if advertisements from the campaigns are targeted and delivered to users during the selected slot). The content simulator may select an available content slot based on average effective impressions of other slots that occurred at previous times, and that may have been at the same time of day (or otherwise be similar to) a slot under consideration. For example, the content simulator may determine, for slots in a previous day, week, or month that delivered addressable content items from various addressable content campaigns (e.g., the addressable content campaign currently managed by the content scheduling servers, any addressable content campaign previously managed by the content scheduling server and/or other content campaigns), the effective impression for the delivered addressable content items. The effective impression of a addressable content campaign may be a number of users who viewed the addressable content items when the addressable content items were delivered to the user and/or who would find the messages in the delivered addressable content items relevant. FIG. 9 shows example number of targeted views for the addressable content campaigns alpha, beta, and gamma that were delivered through the service XYZ on Jun. 22, 2020, during four content delivery slots with similar timings as the available content slots in FIG. 8. The numbers of targeted views during slot 1 are 200,000, 100,000, and 150,000 for the addressable content campaigns alpha, beta, and gamma, respectively, while the numbers of targeted views for the addressable content campaigns alpha, beta, and gamma are 1,000,000, 400,000, and 900,000 respectively during slot 4. The content simulator may rank the slots by the average number of targeted views of the slots, the total number of targeted views, etc. For example, when ranked by the average number of views, slot 4 may be ranked higher than slot 1 as the average effective impressions for slot 4 may be higher than the one for slot 1. Based on the ranking of the slots in the previous week's content delivery schedule, the content simulator may select the available content slot 4 in FIG. 8 as it has similar delivery timing as the highest ranked content slot 4 in FIG. 9.

Referring to FIG. 6B, at step 624, the content simulator may select a addressable content campaign. The content simulator may rank addressable content campaigns and select a higher ranked addressable content item before selecting a lower ranked addressable content campaign. For example, the content simulator may rank the addressable content campaigns by the overall budget of the addressable content campaigns, the goal number of impressions, the CPM, the popularities of the product/services advertised in the addressable content items, the size of the business and/or organization that have requested the addressable content campaigns, etc.

At step 626, the content simulator may select one or more user groups from the plurality of user groups determined at step 610 in FIG. 6A. The content simulator may select the one or more user groups based on users of the selected user groups satisfying the user characteristics of the target recipients of the selected addressable content campaign, constraints specified by the selected addressable content campaigns, and/or other bases. For example, the addressable content campaign 1 in FIG. 5 may comprise addressable content items that may be relevant to high income households, and the content simulator may select user group B in FIG. 7 for addressable content campaign 1 as the comprises users with salaries above $100,000. Alternately, the content simulator may select one or more representative users from the multiple representative users determined for the plurality of user groups at step 612 in FIG. 6A such that the selected representative viewers satisfy user characteristics of the target recipients of the selected addressable content campaign, constraints specified by the selected addressable content campaigns, and/or other bases.

At step 628, the content simulator may predict a number of targeted recipients that may be reached by the selected addressable content campaign (e.g., a number of impressions that may be achieved by the selected addressable content campaign) if one or more addressable content items for the selected addressable content campaign are delivered during the selected available content slot in the content delivery schedules. The content simulator may determine or predict, for each of the representative users of the selected user groups at step 626, whether the representative user will view a targeted addressable content item from the selected addressable content campaign if the addressable content item is targeted toward the representative user during the selected available content slot based on the viewing data associated with the represented user (e.g., whether the representative user views primary content items during the timing associated with the selected content slot). The content simulator may predict that if a selected representative user views the targeted addressable content item, other users that belong to the user group that is represented by the selected representative user will also view the targeted content items. The content simulator may predict that if a representative user does not view the targeted addressable content item, other users that belong to the user group that is represented by the selected representative user will also not view the targeted content items. The content simulator may determine a quantity of targeted views that may be achieved by the selected addressable content campaign if one or more addressable content items for the selected addressable content campaign are delivered during the selected available content slot based on the number of representative users who would view the addressable content items during the selected available content slot and the number of other users who are also members of the user groups of users represented the representative users who would view those addressable content item(s).

At step 630, it may be determined (e.g., by the content simulator) whether viewership data for any other addressable content campaigns have not been predicted for the selected content slot. If there are other addressable content campaigns for which viewership has yet to be predicted for the selected content slot, another addressable content campaign may be selected at step 632, and steps 626 and 628 may be repeated for the addressable content campaign selected at step 632 and the available content slot selected at step 622. If it is determined at step 630 that viewership data for all the addressable content campaigns have been predicted for the selected content slot, step 634 may be performed. In step 634, it may be determined whether viewership data have been predicted for all the content slots in the content delivery schedules. If it is determined in step 634 that not all the content slots have been accounted for, another content slot may be selected for simulation in step 636, and steps 624, 626, 628, 630 and 632 may be repeated for the content slot selected in step 636. If it is determined in step 634 that all the content slots have been accounted for, the process may end at step 638 by sending the predicted viewership data for various combinations of addressable content campaigns and the available content slots in the content delivery schedules to a schedule optimizer, such as the scheduling optimizer 306 in FIG. 3. FIG. 10 shows example predicted quantities of targeted recipients for four available content slots in FIG. 8 for the addressable content campaigns 1, 2, and 3 in FIG. 5. For example, the addressable content campaign 1 may have 200,000, 800,000, 450,000, and 700,000 views by targeted recipients if delivered during the available content slots 1, 2, 3, and 4, respectively. The available content slots may be ranked by the total predicted quantity of target recipients for the slots, an average quantity of targeted recipients predicted for the slots, etc.

The content scheduling system described herein, such as the content scheduling server 122 in FIG. 1, may determine which devices associated with the premises 102 and/or to the mobile devices 125 will receive addressable content items (e.g., addressable advertisements) and which devices will receive non-addressable content items (e.g., linear advertisements) during content slots in content delivery schedules. The content scheduling system may use forecasted or predicted viewership data, such as the predicted quantities of targeted recipients for the addressable content items of the addressable content campaigns, to optimize the placements of the content items from both the addressable and non-addressable content campaigns. Optimized placements of addressable and non-addressable content items may be beneficial when more than two types of content items may be available for delivery to a content user. For example, for a user who likes to take vacations and is looking to buy a new home, a targeted addressable content item for a beach vacation, a targeted addressable content item for home mortgages, or a non-addressable content item for a local mechanic may be available for delivery during a content slot. Optimized placements of addressable and non-addressable content items may also be beneficial when past viewing histories of the users are taken into account to determine whether the users would be predicted to view the scheduled addressable content items. For example, delivering a targeted addressable content item to users during a delivery slot when the users are not predicted to view the content item will not help the addressable content campaign sending the targeted content item to reach its impression goals. The content scheduling may optimize the insertions of addressable and non-addressable content items in streams received by user devices to maximize the impact of the addressable and non-addressable content campaigns. The content scheduling may also optimize the insertions of addressable and non-addressable content items to maximize the fees that may be charged for the delivery of content items by the addressable and non-addressable content campaigns.

In one or more steps of the portion of the method shown in FIG. 6C, content items from addressable content campaigns and non-addressable content campaigns may be assigned to available insertions associated with content slots by a schedule optimizer, such as the schedule optimizer 306 in the content scheduling server 122 in FIG. 3. At step 640, the schedule optimizer may select a plurality of content slots for assignments of addressable and non-addressable content items from various addressable and non-addressable content campaigns. For example, the content simulator may select a content delivery schedule or a portion of a content delivery schedule from the database 314. Alternately, the content simulator may select multiple content delivery schedules. The selected plurality of slots may be associated with a particular service. Additionally and/or alternately, the selected plurality of slots may be associated with one or more geographic locations, and/or comprise some or all available slots for different periods (e.g., a day, weekdays, weekends, a week, two weeks, a month, etc.). For example, the schedule optimizer may select the four content slots available on Jun. 30, 2020, for a service XYZ, as shown in FIG. 11. The four content slots in FIG. 11 may comprise a addressable content slot from 7:55:00 AM to 7:55:45 AM, a non-addressable content slot from 10:55:00 AM to 10:55:45 AM, a third content slot from 1:55:00 PM to 1:55:45 PM, and a fourth content available content from 7:55:00 PM to 7:55:45 PM. The service XYZ may deliver primary content items to one million devices. Therefore, each of the first, second, third, and fourth content slots for service XYZ may be associated with one million insertions of secondary content items in streams received by the one million devices.

At step 642, the schedule optimizer may receive predicted quantities of targeted recipients for addressable content items from various addressable content campaigns during various available content slots. The schedule optimizer may receive the data from a simulator, such as the content simulator 304 in the content scheduling server 122 in FIG. 3. The predicted quantities of targeted users may represent a number of targeted viewers that will view content items from the addressable content campaigns if the content items for the campaigns are delivered during one or more content slots in content delivery schedules (e.g., the predicted quantities of target recipients in FIG. 10).

At step 644, the schedule optimizer may rank the addressable content campaigns. For example, the schedule optimizer may rank two or more addressable content campaigns stored in the addressable content campaigns database 310. The schedule optimizer may rank the addressable content campaigns by the overall budget of the addressable content campaigns, the impression goal, the CPM, the popularities of the product/services advertised in the addressable content items, the size of the business and/or organization that have requested the addressable content campaigns, etc. Alternately, the schedule optimizer or any of the software components of the content scheduling server 122 in FIG. 3 (e.g., the user and slot forecaster 302, or the content simulator 304) may assign a priority level or number to the addressable content campaigns, and the schedule optimizer may rank the addressable content campaigns based of their assigned priorities.

At step 646, the schedule optimizer may rank the non-addressable content campaigns. For example, the schedule optimizer may rank two or more non-addressable content campaigns stored in the non-addressable content campaign database 312. The schedule optimizer may rank the non-addressable content campaigns by the overall budget of the non-addressable content campaigns, the budget per thousand insertions of the non-addressable content items, the budget per million insertions of the non-addressable content items, the popularities of the product/services advertised in the non-addressable content items, the size of the business and/or organization associated with the non-addressable content campaigns, etc. Alternately, the schedule optimizer or any of the software components of the content scheduling server 122 in FIG. 3 (e.g., the user and slot forecaster 302, or the content simulator 304) may assign a priority level or number to the non-addressable content campaigns, and the schedule optimizer may rank the non-addressable content campaigns based of their assigned priorities.

At step 648, the schedule optimizer may select the highest ranked addressable content campaign and the highest ranked non-addressable content campaign. For example, the schedule optimizer may rank the three addressable content campaigns in FIG. 4 based on their CPMs and select the addressable content campaign 3 with the highest CPM. Additionally, the schedule optimizer may rank the three non-addressable content campaigns in FIG. 5 based on their budgets per thousand insertions and select the non-addressable content campaign 2 with the highest budget per thousand insertions. Alternately, the schedule optimizer may randomly select a addressable content campaign and a non-addressable content campaign. Alternately, the schedule optimizer may select the highest ranked addressable content campaign and randomly select a non-addressable content campaign, or vice versa.

At step 650, the schedule optimizer may assign content items from the selected addressable content campaign and the selected second campaign from step 646 to insertions associated with the content slots selected at step 640. For example, the schedule optimizer may assigned content items from the addressable content campaign 3 and the non-addressable content campaign 2 selected at step 648 to some of the four million insertions associated with the four content slots in FIG. 11. The schedule optimizer may perform the assignment of the addressable and non-addressable content items via an optimization method, such as linear programming methods. Various other optimization methods will readily occur to those skilled in the art. Such variation of optimization methods, though not expressly stated herein, and are intended to be within the spirit and scope of the disclosure.

Linear programming may be a technique for the optimization of one or more linear objective functions while complying with one or more linear constraints. The content scheduling server and one or more of the addressable and non-addressable content campaigns may determine the linear objective functions and/or the linear constraints. The linear objective functions may be subject to one or more goals of the content scheduling system 122. The goals of the content scheduling system may be to maximize the number of views of the assigned addressable and non-addressable content items from the selected addressable and non-addressable content campaigns, maximize revenue generated via assignments of the addressable and non-addressable content items, and/or any other goals. The schedule optimizer may determine the placements of the addressable and non-addressable content items from the selected addressable and non-addressable content campaigns in insertions associated with the selected content slots by globally maximizing or minimizing the linear objective functions while complying with the linear constraints. For example, the schedule optimizer may predictively place the addressable and non-addressable content items in various available insertions associated with the selected content slots to find optimal placements of the content items such that the linear objective functions attain a global maximum or minimum, and the optimal placements comply with the linear constraints. The linear objective functions may be based on values associated with assignments of addressable content items from the selected addressable content campaign and assignments of non-addressable content items from the selected non-addressable content campaign in insertions associated with the selected content slots. The values associated with the assignments of the addressable content items may be different than the values associated with the assignments of the non-addressable content items. For example, the values associated with assignments of the addressable content items may be based on the predicted quantities of targeted recipients of any addressable content items assigned for the selected addressable content campaign and/or the quantities of insertions of the addressable content items from the selected addressable content campaign into streams received by devices of targeted recipients of the selected addressable content campaign. The values associated with assignments of the non-addressable content items may be based on insertions of the non-addressable content items from the selected non-addressable content campaigns in various streams received by user devices during the content slots. Various algorithms may be used to globally optimize, maximize, or minimize the linear objective functions while complying with the linear constraints, such as the simplex algorithm, the crisscross algorithm, the ellipsoid algorithm, the projective algorithm, Vaidya's 87 algorithm, Vaidya's 89 algorithm, input sparsity time algorithms, current matrix multiplication time algorithm, etc.

The linear constraints that are to be complied with during the optimization of the linear objective functions for assigning of the content items may be specified by the addressable and/or non-addressable content campaigns. Additionally or alternately, the schedule optimizer, the scheduling server, the content server, and/or the local office may specify the linear constraints. For example, the linear constraints may comprise any geographical, timing, and/or delivery constraints specified by the addressable and/or non-addressable content campaigns (e.g., the constraints 408 in FIG. 4 and the constraints 506 in FIG. 5). Additionally or alternately, the linear constraints may comprise one or more of the following: the number of assigned insertions during a content slot may not exceed the total number of available insertions for that content slots, total number of insertions for a non-addressable content campaign may not exceed the number of insertions requested by that non-addressable content campaign, a difference between the total predicted targeted recipients for assigned addressable content items for an addressable content campaign and the impression goal specified by that addressable content campaign should be less than a predetermined tolerance value (e.g., if the impression goal is 2,000,000, the total predicted impression during scheduling should be at least 80% of the impression goal), a addressable content campaign or a non-addressable content campaign may not occupy insertions of more than a predetermined percentage of available content slots for content delivery schedules across a single service or multiple services (e.g., an advertisement campaign may not dominate more than 30% of all advertisement air time in a specific television channel), a addressable content campaign or a non-addressable content campaign may not occupy insertions of more than a predetermined percentage of available content slots for content delivery schedules for a geographical region (e.g., an advertisement campaign may not dominate more than 20% of all advertisement air time in the city of Lewisville, TX or the state of Texas), a addressable content campaign or a non-addressable content campaign may not occupy insertions of more than a predetermined percentage of available content slots for content delivery schedules for a range of time (e.g., an hour, a day, a week, a month, etc.), any two insertions of a secondary content item in a stream must be separated by a predefined time period (e.g., to prevent the secondary content item from showing multiple times in a row), two or more content items from a first or non-addressable content campaign may not be assigned during a single available content slot (e.g., the content items may not be shown back-to-back during a single content slot or separated by content items from other content campaigns during the single content slot), two or more content items from a first or non-addressable content campaign may not be assigned during two adjacent available content slots, etc. Additionally or alternately, the scheduling server, the content server, and/or the local office may specify a linear constraint where two or more content campaigns (e.g., two addressable content campaigns, two non-addressable content campaigns, and/or one addressable content campaign and one non-addressable content campaign, etc.) may be linked such that content items from all the linked content campaigns may require to be assigned to insertions during a single available content slot or may be prohibited from being assigned to insertions during a single available content slot. The schedule optimizer may assign addressable content items from addressable content campaigns to insertions associated with content slots such that the predicted quantities of targeted recipients through the insertions of the addressable content items satisfy a threshold. Various additional linear constraints may also or alternatively be used, and/or there may be alterations, modifications, and improvements, additions of the linear constraints. The linear constraints may be stored in the slot allocation constraints database 316 in FIG. 3 and accessed by the schedule optimizer during the optimization process.

Even if content items from the selected addressable and non-addressable content campaigns are inserted in streams associated with a particular service, some users may not view the inserted content items as their devices may be turned off or being used to receive other content via other services. An objective or goal of the schedule optimizer may be to maximize values associated with the number of views or impressions of the addressable and non-addressable content items from the selected addressable and non-addressable content campaigns assigned to insertions associated with the selected content slots at step 640. The objective to maximize the number of views/impressions of the addressable and non-addressable content items may be represented by the linear objective function:

$$\text{MAX} \left( \sum_{i \in A} \text{a quantity of targeted recipients of first content item at slot } i + \sum_{j \in B} \text{a quantity of insertions of second content item at slot } j * GRP \text{ at slot } j \right)$$

where A may denote a set of slots, from the plurality of slots selected at step 640, that have insertions assigned to the addressable content items from the selected addressable content campaign, and B may denote a set of slots, from the plurality of slots selected at step 640, that have insertions assigned to the non-addressable content items from the selected non-addressable content campaign. The set A and/or the set B may include all the slots selected at step 640 (e.g., each of the slots selected in step 640 may comprise insertions assigned to a addressable content item of the selected addressable content campaign and/or insertions assigned to a non-addressable content item of the selected non-addressable content campaign). Additionally or alternately, the set A may be equivalent to the set B (e.g., each of the slots that comprises insertions assigned to a addressable content item may also comprise insertions assigned to a non-addressable content item). Alternately, the sets A and B may not be equivalent (e.g., one or more of the slots may only comprise insertions assigned to addressable content items, and/or one or more of the slots may only comprise insertions assigned to non-addressable content items). The term "a quantity of targeted recipients of addressable content item at slot i" may represent a quantity of users who would watch the addressable content item if the addressable content item is delivered during the slot i where slot i is a member of the set A. The term "a quantity of targeted recipients of addressable content item at slot i" may be predicted by the content simulator 304 in FIG. 3. In order to maximize the number of views of addressable content items from the selected addressable content campaign, the schedule optimizer may assign addressable content items to insertions of content slots that have the highest forecasted or predicted quantities of targeted recipients for the selected addressable content campaign while complying with the linear constraints. The linear objective function may determine the total number of views for the addressable content campaign by summing over the targeted recipients at each member slot i of the set A. The term "a quantity of insertions of non-addressable content item at slot j" may represent the quantity of insertions of the non-addressable content item assigned during slot j where slot j is a member of the set B. The term "GRP at slot j" may denote the gross rating points of the primary content item being delivered during the content slot j (e.g., a percentage of users who would watch the non-addressable content item while watching the primary content item associated with the content slot j). Therefore, the number of views of the non-addressable content items of the selected non-addressable content campaign at slot j may be the product of the terms "a quantity of insertions of non-addressable content item at slot j" and "GRP at slot j." In order to maximize the number of views generated from the selected non-addressable content campaign, the schedule optimizer may assign non-addressable content items to insertions of content slots that have high GRPs and comply with the linear constraints. The linear objective function may determine the total number of views of the non-addressable content items of the non-addressable content campaign by summing over the number of views at each member slot j of the set B. The schedule optimizer may determine the optimal assignments of the addressable and non-addressable content items by simultaneously maximizing the number of views of the addressable content items from the selected addressable content campaign and the number of views of the non-addressable content items from the selected non-addressable content campaign.

Alternately, the delivery of the content items from the addressable and non-addressable content campaigns may comprise a source of revenue for content distribution networks (e.g., service or content providers, network operators, national television broadcasters, local over-the-air affiliates, streaming services, etc.). A linear objective function may be based on maximizing revenue from the addressable and non-addressable content items. Below is an example of such a linear objection function:

MAX $$\left(\sum_{k \in C} \text{a quantity of targeted recipients of first content item at slot } i * \text{cost per targeted view} + \sum_{l \in D} \text{a quantity of insertions of second content item at slot } j * \text{cost per insertion}\right)$$

where C may denote a set of slots, from the plurality of slots selected at step 640, that have insertions assigned to the addressable content items from the selected addressable content campaign, and D may denote a set of slots, from the plurality of slots selected at step 640, that have insertions assigned to the non-addressable content items from the selected non-addressable content campaign. The set C and/or the set D may include all the slots selected at step 640 (e.g., each of the slots selected in step 640 may comprise insertions assigned to a addressable content item of the selected addressable content campaign and/or insertions assigned to a non-addressable content item of the selected non-addressable content campaign). Additionally or alternately, the set C may be equivalent to the set D (e.g., each of the slots that comprises insertions assigned to a addressable content item may also comprise insertions assigned to a non-addressable content item). Alternately, the sets C and D may not be equivalent (e.g., one or more of the slots may only comprise insertions assigned to addressable content items, and/or one or more of the slots may only comprise insertions assigned to non-addressable content items). The term "a quantity of targeted recipients of addressable content item at slot i" may represent the quantity of users who would watch the addressable content item if the addressable content item is delivered during the slot k and would find the messages in the addressable content item relevant. The term "a quantity of targeted recipients of addressable content item at slot k" may be forecasted or predicted by the content simulator 304 in FIG. 3. The term "cost per targeted view" may be the fee the selected addressable content campaign is offering to pay per view by a targeted recipient of the addressable content item (e.g., cost per targeted view of addressable content campaign 3 is $0.015 based on the CPM of the addressable content campaign 3). Therefore, the revenue that may be collected from the selected addressable content campaign at slot k may be the product of the terms "a quantity of targeted recipients of addressable content item at slot k" and "cost per targeted view." The linear objective function may determine the revenue generated by the addressable content campaign by summing over the revenues generated at each member slot k of the set A. In order to maximize revenue generated from the selected addressable content campaign, the schedule optimizer may assign addressable content items to insertions of content slots that have the highest forecasted or predicted quantities of targeted recipients for the selected addressable content campaign while complying with the linear constraints (e.g., addressable content items from the addressable content campaign 3 is assigned to insertions associated with slot 4 for which the highest quantity of targeted recipients was predicted by the content simulator as shown in FIG. 10 and the assignments comply with the timing constraints of the addressable content campaign 3). The term "a quantity of insertions of non-addressable content item at slot l" may represent the quantity of insertions of the non-addressable content item assigned during slot l where slot l is a member of the set D (e.g., non-addressable content campaign 2 has one million insertions in slot 3 as shown in FIG. 11). "Cost per insertion" may denote the fee the selected non-addressable content campaign is offering to pay for every insertion of the non-addressable content item (e.g., cost per insertion for the non-addressable content campaign 3 is $0.01 based on the budget per 1000 insertions as shown in FIG. 5). Therefore, the revenue that may be collected from the selected non-addressable content campaign at slot l may be the product of the terms "a quantity of insertions of non-addressable content item at slot l" and "cost per insertion." In order to maximize revenue generated from the selected non-addressable content campaign, the schedule optimizer may assign non-addressable content items to insertions that comply with the linear constraints (e.g., non-addressable content items from the non-addressable content campaign 2 is assigned to insertions associated with slots 2 and 3 for the assignments comply with the timing constraints of the non-addressable content campaign 2). Additionally or alternately, the cost of insertion of the non-addressable content item may be different for slots (e.g., cost of insertion is $0.01 during slot 1 and $0.05 during slot 4), and the schedule optimizer may assign non-addressable content items to insertions associated with slots that have a higher cost of insertions. The linear objective function may determine the revenue generated by the non-addressable content campaign by summing over the revenues generated at each member slot l of the set D. The schedule optimizer may determine the optimal assignments of the addressable and non-addressable content items by simultaneously maximizing the revenues generated from the selected addressable content campaign and the revenues generated from the selected non-addressable content campaign.

The schedule optimizer may rank the available content slots based on the predicted impressions that may be achieved by the content slots. The schedule optimizer may assign content items to insertions associated with higher ranked content slots before assigning content items to insertions of lower ranked content slots. For a content slot, the schedule optimizer may assign addressable content items from the selected addressable content campaigns, non-addressable content items from the selected non-addressable content campaigns, and/or from both campaigns in insertions associated with the content slot. FIG. 11 shows an example content delivery schedule with multiple assignments to addressable and non-addressable content items. As shown in FIG. 11, the schedule optimizer assigned 500,000 insertions of non-addressable content items from the highest ranked non-addressable content campaign 2 in FIG. 4 during the content slot 2 and one million insertions of the non-addressable content items from the non-addressable content campaign 3 during the content slot 3. The schedule optimizer also assigned addressable content items from the highest ranked addressable content campaign 3 in FIGS. 5 to 500,000 insertions during the content slot 2 and one million insertions during the content slot 4.

Because of the various linear constraints imposed during assignments of the addressable and addressable content items via linear programming based the linear objective functions, content items from the selected addressable content campaign and the non-addressable content campaign may not be assigned to every available insertion in the selected plurality of content slots at step 640. For example, multiple insertions are still available for assignments in the partially assigned content delivery schedule in FIG. 11. Referring back to FIG. 6C, at step 652, it may be determined (e.g., by the schedule optimizer) whether all the insertions of the selected content slots in the selected plurality of content slots have been assigned either a non-addressable content item or a addressable content item. If so, then the scheduling process may end at step 654. If not, step 648 may be repeated for the next highest ranked unassigned addressable content campaign, the next highest ranked unassigned non-addressable content campaign, a randomly chosen non-addressable content campaign, and/or a randomly chosen addressable content campaign.

At step 654, the schedule optimizer may send the content delivery schedules to an executor, such as the scheduled content executor 308 in the content scheduling server 122 in FIG. 3, and/or to the content server 106 in FIG. 1. Alternately, the schedule optimizer may store the content delivery schedules in the database 318 in FIG. 3.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
receiving data indicating a plurality of candidate content items for insertion into a content stream, wherein the plurality of candidate content items comprises:
a first content item for delivery based on dynamically determining preferences of current users accessing the content stream;
a second content item for delivery based on dynamically determining the preferences of current users accessing the content stream; and
a third content item for delivery without dynamically determining the preferences of current users accessing the content stream;
predicting:
a quantity of first users that will view, at a slot in the content stream, the first content item, and
a quantity of second users that will view, at the slot, the second content item;
selecting, based on a comparison between the predicted quantity of first users and the predicted quantity of second users, one of the first content item or the second content item; and
causing, via insertions at the slot in the content stream, delivery of:
the selected one of the first content item or the second content item to one or more first user groups, and
the third content item to one or more second user groups.

2. The method of claim 1, wherein:
the first users that will view the first content item and the second users that will view the second content item have characteristics indicating one or more of: a time period associated with content viewing, a content service, a content genre or type, family data, one or more hobbies, an income level, a political affiliation, age groups, gender, ethnicities, a marital status, an occupation, or an education level.

3. The method of claim 1, wherein the selecting the one of the first content item or the second content item is further based on one or more of:
a geographic constraint on delivery of the first content item or the second content item, a time constraint on delivery of the first content item or the second content item, a content service constraint on delivery of the first content item or the second content item, a constraint on a type of content item associated with the slot, a constraint on a quantity of deliveries of the first content item or second content item to user devices, a constraint associated with the predicted quantity of first users that will view the first content item, a constraint associated with the predicted quantity of second users that will view the second content item, or a constraint, of the first content item or the second content item, associated with another content item delivered during the slot.

4. The method of claim 1, wherein the selecting the one of the first content item or the second content item comprises:
maximizing, using one or more linear programming algorithms, based on an objective function based on the predicted quantity of first users that will view the first content item, the predicted quantity of second users that will view the second content item, and a quantity of user devices that will receive the third content item.

5. The method of claim 1, wherein the selecting the one of the first content item or the second content item comprises:
- determining a first value associated with delivering the first content item to the predicted quantity of first users at the slot;
- determining a second value associated with delivering the first content item to the predicted quantity of second users at the slot; and
- selecting, based on the first value and the second value, the one of the first content item or the second content item.

6. The method of claim 1, wherein the causing the delivery of the selected one of the first content item or the second content item to the one or more first user groups comprises:
- determining a first value associated with delivering the selected one of the first content item or the second content item to the one or more first user groups;
- determining a second value associated with delivering the third content item to the one or more first user groups; and
- causing, based on the first value and the second value, the delivery of the selected one of the first content item or the second content item to the one or more first user groups.

7. A system comprising:
a computing device and a storage device;
wherein the computing device is configured to:
- receive data indicating a plurality of candidate content items for insertion into a content stream, wherein the plurality of candidate content items comprises:
  - a first content item for delivery based on dynamically determining preferences of current users accessing the content stream;
  - a second content item for delivery based on dynamically determining the preferences of current users accessing the content stream; and
  - a third content item for delivery without dynamically determining the preferences of current users accessing the content stream;
- predict:
  - a quantity of first users that will view, at a slot in the content stream, the first content item, and
  - a quantity of second users that will view, at the slot, the second content item;
- select, based on a comparison between the predicted quantity of first users and the predicted quantity of second users, one of the first content item or the second content item; and
- cause, via insertions at the slot in the content stream, delivery of:
  - the selected one of the first content item or the second content item to one or more first user groups, and
  - the third content item to one or more second user groups; and
wherein the storage device is configured to store the first content item.

8. The system of claim 7, wherein:
the first users that will view the first content item and the second users that will view the second content item have characteristics indicating one or more of: a time period associated with content viewing, a content service, a content genre or type, family data, one or more hobbies, an income level, a political affiliation, age groups, gender, ethnicities, a marital status, an occupation, or an education level.

9. The system of claim 7, wherein the computing device is configured to select the one of the first content item or the second content item is further based on one or more of:
- a geographic constraint on delivery of the first content item or the second content item, a time constraint on delivery of the first content item or the second content item, a content service constraint on delivery of the first content item or the second content item, a constraint on a type of content item associated with the slot, a constraint on a quantity of deliveries of the first content item or second content item to user devices, a constraint associated with the predicted quantity of first users that will view the first content item, a constraint associated with the predicted quantity of second users that will view the second content item, or a constraint, of the first content item or the second content item, associated with another content item delivered during the slot.

10. The system of claim 7, wherein the computing device is configured to select the one of the first content item or the second content item based on:
- maximizing, using one or more linear programming algorithms, based on an objective function based on the predicted quantity of first users that will view the first content item, the predicted quantity of second users that will view the second content item, and a quantity of user devices that will receive the third content item.

11. The system of claim 7, wherein the computing device is configured to select the one of the first content item or the second content item based on:
- determining a first value associated with delivering the first content item to the predicted quantity of first users at the slot;
- determining a second value associated with delivering the first content item to the predicted quantity of second users at the slot; and
- selecting, based on the first value and the second value, the one of the first content item or the second content item.

12. The system of claim 7, wherein the computing device is configured to cause the delivery of the selected one of the first content item or the second content item to the one or more first user groups based on:
- determining a first value associated with delivering the selected one of the first content item or the second content item to the one or more first user groups;
- determining a second value associated with delivering the third content item to the one or more first user groups; and
- causing, based on the first value and the second value, the delivery of the selected one of the first content item or the second content item to the one or more first user groups.

13. An apparatus comprising:
one or more processors; and
memory storing instructions that, when executed by the one or more processors, cause the apparatus to:
- receive data indicating a plurality of candidate content items for insertion into a content stream, wherein the plurality of candidate content items comprises:
  - a first content item for delivery based on dynamically determining preferences of current users accessing the content stream;
  - a second content item for delivery based on dynamically determining the preferences of current users accessing the content stream; and a third content item for delivery without dynamically determining the preferences of current users accessing the content stream;
predict:
a quantity of first users that will view, at a slot in the content stream, the first content item, and
a quantity of second users that will view, at the slot, the second content item;
select, based on a comparison between the predicted quantity of first users and the predicted quantity of second users, one of the first content item or the second content item; and
cause, via insertions at the slot in the content stream, delivery of:
the selected one of the first content item or the second content item to one or more first user groups, and
the third content item to one or more second user groups.

14. The apparatus of claim 13, wherein:
the first users that will view the first content item and the second users that will view the second content item have characteristics indicating one or more of: a time period associated with content viewing, a content service, a content genre or type, family data, one or more hobbies, an income level, a political affiliation, age groups, gender, ethnicities, a marital status, an occupation, or an education level.

15. The apparatus of claim 13, wherein the memory storing instructions that, when executed by the one or more processors, cause the apparatus to further:
select the one of the first content item or the second content item is further based on one or more of:
a geographic constraint on delivery of the first content item or the second content item, a time constraint on delivery of the first content item or the second content item, a content service constraint on delivery of the first content item or the second content item, a constraint on a type of content item associated with the slot, a constraint on a quantity of deliveries of the first content item or second content item to user devices, a constraint associated with the predicted quantity of first users that will view the first content item, a constraint associated with the predicted quantity of second users that will view the second content item, or a constraint, of the first content item or the second content item, associated with another content item delivered during the slot.

16. The apparatus of claim 13, wherein the memory storing instructions that, when executed by the one or more processors, cause the apparatus to further:
select the one of the first content item or the second content item based on:
maximizing, using one or more linear programming algorithms, based on an objective function based on the predicted quantity of first users that will view the first content item, the predicted quantity of second users that will view the second content item, and a quantity of user devices that will receive the third content item.

17. The apparatus of claim 13, wherein the memory storing instructions that, when executed by the one or more processors, cause the apparatus to further:
select the one of the first content item or the second content item based on:
determining a first value associated with delivering the first content item to the predicted quantity of first users at the slot;
determining a second value associated with delivering the first content item to the predicted quantity of second users at the slot; and
selecting, based on the first value and the second value, the one of the first content item or the second content item.

18. The apparatus of claim 13, wherein the memory storing instructions that, when executed by the one or more processors, cause the apparatus to further:
cause the delivery of the selected one of the first content item or the second content item to the one or more first user groups based on:
determining a first value associated with delivering the selected one of the first content item or the second content item to the one or more first user groups;
determining a second value associated with delivering the third content item to the one or more first user groups; and
causing, based on the first value and the second value, the delivery of the selected one of the first content item or the second content item to the one or more first user groups.

19. A non-transitory computer-readable medium storing instructions that, when executed, cause:
receiving data indicating a plurality of candidate content items for insertion into a content stream, wherein the plurality of candidate content items comprises:
a first content item for delivery based on dynamically determining preferences of current users accessing the content stream;
a second content item for delivery based on dynamically determining the preferences of current users accessing the content stream; and
a third content item for delivery without dynamically determining the preferences of current users accessing the content stream;
predicting:
a quantity of first users that will view, at a slot in the content stream, the first content item, and
a quantity of second users that will view, at the slot, the second content item;
selecting, based on a comparison between the predicted quantity of first users and the predicted quantity of second users, one of the first content item or the second content item; and
causing, via insertions at the slot in the content stream, delivery of:
the selected one of the first content item or the second content item to one or more first user groups, and
the third content item to one or more second user groups.

20. The non-transitory computer-readable medium of claim 19, wherein:
the first users that will view the first content item and the second users that will view the second content item have characteristics indicating one or more of: a time period associated with content viewing, a content service, a content genre or type, family data, one or more hobbies, an income level, a political affiliation, age groups, gender, ethnicities, a marital status, an occupation, or an education level.

21. The non-transitory computer-readable medium of claim 19, wherein the selecting the one of the first content item or the second content item is further based on one or more of:
a geographic constraint on delivery of the first content item or the second content item, a time constraint on delivery of the first content item or the second content item, a content service constraint on delivery of the first content item or the second content item, a constraint on a type of content item associated with the slot, a constraint on a quantity of deliveries of the first content item or second content item to user devices, a constraint associated with the predicted quantity of first users that will view the first content item, a constraint associated with the predicted quantity of second users that will view the second content item, or a constraint, of the first content item or the second content item, associated with another content item delivered during the slot.

22. The non-transitory computer-readable medium of claim 19, wherein the selecting the one of the first content item or the second content item comprises:
maximizing, using one or more linear programming algorithms, based on an objective function based on the predicted quantity of first users that will view the first content item, the predicted quantity of second users that will view the second content item, and a quantity of user devices that will receive the third content item.

23. The non-transitory computer-readable medium of claim 19, wherein the selecting the one of the first content item or the second content item comprises:
determining a first value associated with delivering the first content item to the predicted quantity of first users at the slot;
determining a second value associated with delivering the first content item to the predicted quantity of second users at the slot; and
selecting, based on the first value and the second value, the one of the first content item or the second content item.

24. The non-transitory computer-readable medium of claim 19, wherein the causing the delivery of the selected one of the first content item or the second content item to the one or more first user groups comprises:
determining a first value associated with delivering the selected one of the first content item or the second content item to the one or more first user groups;
determining a second value associated with delivering the third content item to the one or more first user groups; and
causing, based on the first value and the second value, the delivery of the selected one of the first content item or the second content item to the one or more first user groups.

* * * * *